United States Patent
Pighi et al.

(10) Patent No.: US 11,659,154 B1
(45) Date of Patent: *May 23, 2023

(54) VIRTUAL HORIZONTAL STEREO CAMERA

(71) Applicant: Ambarella International LP, Santa Clara, CA (US)

(72) Inventors: Omar Pighi, Via Venezia (IT); Alessandro Pacchioni, Pavullo Nel Frignano (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,744

(22) Filed: Feb. 25, 2022

Related U.S. Application Data

(63) Continuation of application No. 17/000,495, filed on Aug. 24, 2020, now Pat. No. 11,343,485.

(51) Int. Cl.
*H04N 13/239* (2018.01)
*G06N 3/08* (2023.01)
*B60R 11/04* (2006.01)
*H04N 23/51* (2023.01)
(Continued)

(52) U.S. Cl.
CPC ............ *H04N 13/239* (2018.05); *B60R 11/04* (2013.01); *G06N 3/08* (2013.01); *H04N 23/51* (2023.01); *H04N 23/57* (2023.01); *H04N 23/90* (2023.01); *H04N 2213/001* (2013.01)

(58) Field of Classification Search
CPC ......... H04N 13/239; H04N 2013/0081; H04N 13/246; H04N 13/111; H04N 13/189; H04N 13/128; H04N 13/194; H04N 13/271; H04N 13/122; H04N 13/167; H04N 13/204; H04N 5/247; H04N 13/117; H04N 13/161; H04N 13/243; H04N 13/254; H04N 5/23238;
(Continued)

(56) References Cited

U.S. PATENT DOCUMENTS

| | | | |
|---|---|---|---|
| 10,937,181 B2 * | 3/2021 | Amano | H04N 13/204 |
| 11,054,245 B2 * | 7/2021 | Takahashi | G06T 7/00 |
| 11,064,177 B2 * | 7/2021 | Watanabe | G06V 10/34 |

(Continued)

OTHER PUBLICATIONS

N. Suganuma ("Obstacle Detection Using Virtual Disparity Image for Non-flat road", 2018 IEEE Intelligent vehicle symposium, published on Jun. 4-6, 2008) (Year: 2008).*

*Primary Examiner* — Masum Billah
(74) *Attorney, Agent, or Firm* — Christopher P. Maiorana, PC

(57) ABSTRACT

An apparatus including a stereo camera and a processor. The stereo camera may comprise a first capture device and a second capture device in a vertical orientation. The first capture device may be configured to generate first pixel data and the second capture device may be configured to generate second pixel data. The processor may be configured to receive the first pixel data and the second pixel data, generate a vertical disparity image in response to the first pixel data and the second pixel data, generate a virtual horizontal disparity image in response to the first pixel data and the vertical disparity image and detect objects by analyzing the vertical disparity image and the virtual horizontal disparity image. An analysis of the virtual horizontal disparity image may enable the processor to detect the objects not detected in the vertical disparity image alone.

20 Claims, 13 Drawing Sheets

(51) Int. Cl.
*H04N 23/57* (2023.01)
*H04N 23/90* (2023.01)

(58) Field of Classification Search
CPC .. H04N 13/296; H04N 13/257; H04N 13/133; H04N 13/15
USPC .......................................................... 348/46
See application file for complete search history.

(56) References Cited

U.S. PATENT DOCUMENTS

| | | | |
|---|---|---|---|
| 2005/0078865 A1* | 4/2005 | Criminisi | H04N 7/144 382/154 |
| 2012/0262553 A1* | 10/2012 | Chen | H04N 13/111 348/47 |

* cited by examiner

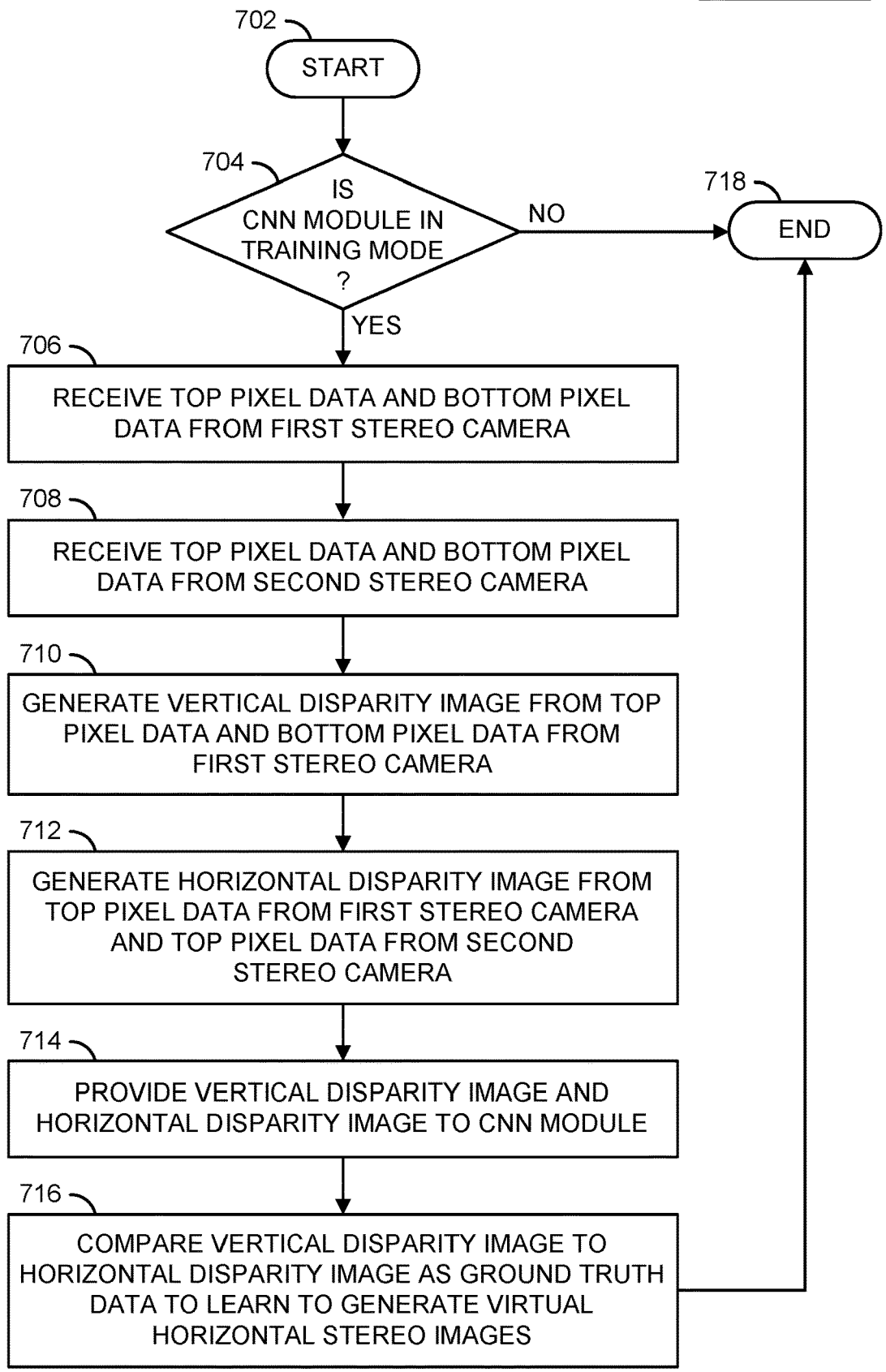

VIRTUAL HORIZONTAL STEREO CAMERA

This application relates to U.S. application Ser. No. 17/000,495, filed on Aug. 24, 2020, which is hereby incorporated by reference in its entirety.

FIELD OF THE INVENTION

The invention relates to computer vision generally and, more particularly, to a method and/or apparatus for implementing a virtual horizontal stereo camera.

BACKGROUND

Stereo vision provides useful data for computer vision. Using previously known information about the relationship between two cameras arranged in a stereo pair (i.e., a distance between the two cameras, an angle of the two cameras) a distance to various objects from the stereo pair of cameras can be calculated. Distance information can be useful for determining spatial relationships between objects and/or determining a size of an object.

Stereo pairs of cameras can be arranged in various orientations (i.e., horizontal orientation, vertical orientation, diagonal orientation, etc.). Each orientation has advantages and disadvantages. In a vertical baseline orientation, there can be a problem when detecting vertical poles. Vertical poles represent a singularity in a disparity calculation. Using a horizontal orientation could resolve the issue, but using a horizontal baseline orientation sacrifices the advantages of the vertical baseline orientation. Implementing multiple stereo camera pairs to have multiple orientations is cost prohibitive.

It would be desirable to implement a virtual horizontal stereo camera.

SUMMARY

The invention concerns an apparatus comprising a stereo camera and a processor. The stereo camera may comprise a first capture device and a second capture device in a vertical orientation. The first capture device may be configured to generate first pixel data and the second capture device may be configured to generate second pixel data. The processor may be configured to receive the first pixel data and the second pixel data, generate a vertical disparity image in response to the first pixel data and the second pixel data, generate a virtual horizontal disparity image in response to the first pixel data and the vertical disparity image and detect objects by analyzing the vertical disparity image and the virtual horizontal disparity image. An analysis of the virtual horizontal disparity image may enable the processor to detect the objects not detected in the vertical disparity image alone.

BRIEF DESCRIPTION OF THE FIGURES

Embodiments of the invention will be apparent from the following detailed description and the appended claims and drawings.

FIG. 13 is a flow diagram illustrating a method for training a convolutional neural network to generate virtual horizontal disparity images using two vertically oriented stereo cameras.

DETAILED DESCRIPTION OF THE EMBODIMENTS

Figure 1:
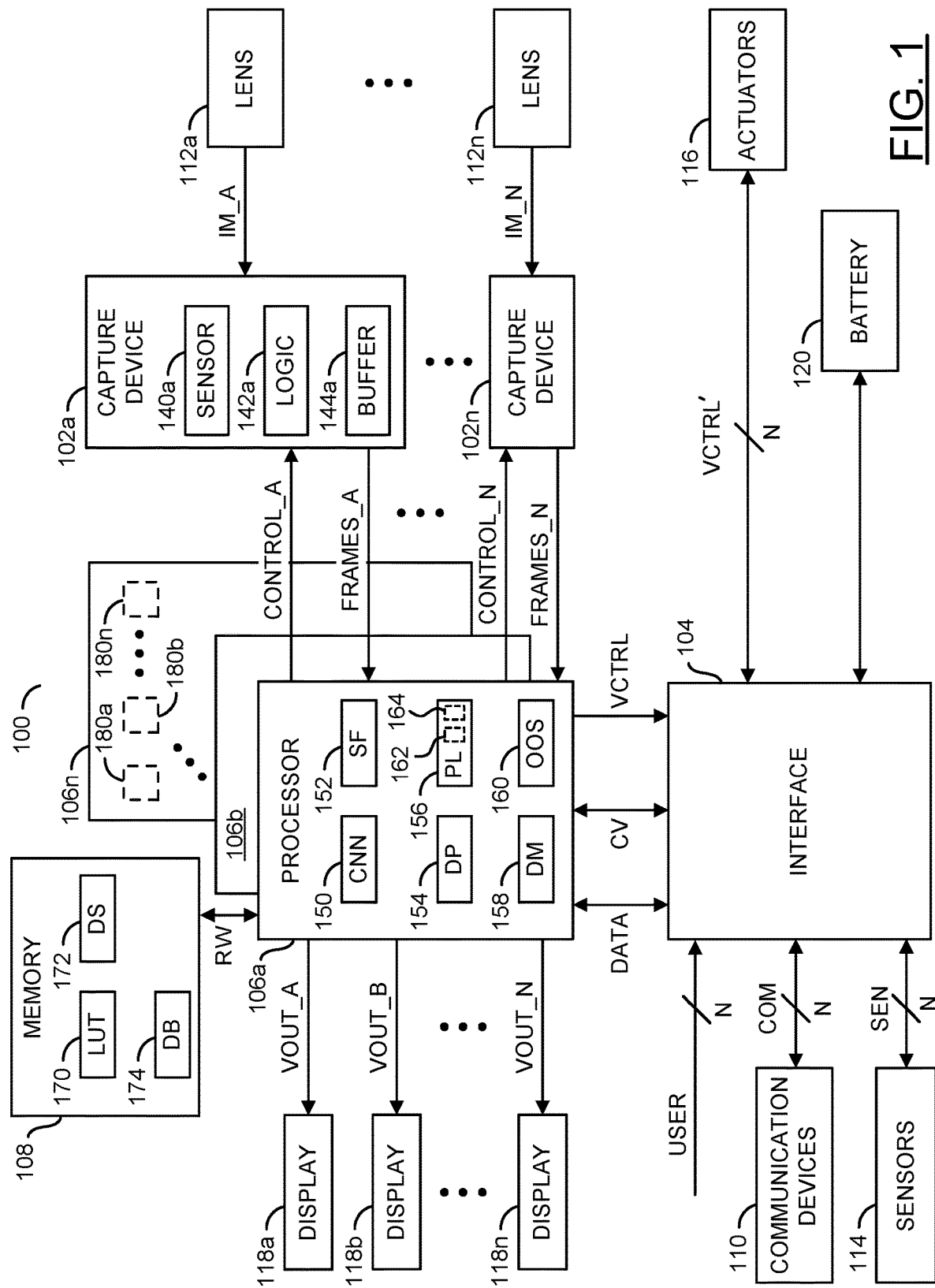
FIG. 1 is a diagram illustrating an embodiment of the present invention.

Embodiments of the present invention include providing a virtual horizontal stereo camera that may (i) train a convolutional neural network using a pair of vertically oriented stereo camera pairs, (ii) generate a horizontal disparity image from pixel data generated by a vertically oriented stereo camera pair, (iii) train a convolutional neural network to fill in missing disparity values, (iv) use the top two images of from two vertically oriented stereo camera pairs as training data for determining the horizontal disparity, (v) enable object detection for an all-around view for a vehicle, (vi) improve detection of thin vertical objects using a vertically oriented stereo camera and/or (vii) be implemented as one or more integrated circuits.

Embodiments of the present invention may be implemented as part of a computer vision system of a vehicle. Embodiments of the present invention may be configured to generate a virtual horizontal disparity image in response to an image generated by a vertically oriented stereo camera. The horizontal disparity image may be a 'virtual image' generated to create a representation of what a horizontally oriented stereo camera would generate.

For example, only a vertically oriented stereo camera may be implemented on an ego vehicle when virtual horizontal disparity images are generated. The virtual horizontal disparity image may be generated as a prediction of an image that would be generated if one of the cameras of the vertically oriented stereo camera was in a horizontally oriented stereo camera pair. However, no horizontally oriented stereo camera may actually be present. The virtual horizontal disparity image may be used instead of actually capturing a horizontal disparity image.

Embodiments of the present invention may implement a convolutional neural network (CNN). The CNN may be configured to generate the virtual horizontal disparity image. The vertically oriented stereo camera pair may capture a vertical disparity space image (DSI). The vertical DSI may be one source of input data for the CNN. In an example, the vertical DSI may be generated by performing semi-global matching (SGM). One of the images captured by one of the cameras of the vertically oriented stereo camera may be another source of input data for the CNN. The CNN may generate the virtual horizontal disparity space image in response to the vertical DSI and the images captured by one of the cameras of the vertically oriented stereo camera. For example, the CNN may be configured to fill in missing disparity values to create the virtual horizontal image (e.g., compared to generating an entire horizontal DSI, which would be necessary if performing disparity generation from a monoscopic image).

Embodiments of the present invention may be configured to train the CNN to generate the virtual horizontal DSI. In one example, a horizontally oriented stereo camera may capture an actual horizontal DSI that may be used to train the CNN. For example, the actual horizontal DSI may be generated using SGM. The actual horizontal DSI may be used as a training signal (e.g., ground truth disparity). The vertical DSI generated by the vertically oriented stereo camera may be used as a regularizing signal.

Embodiments of the present invention may be configured to train the CNN to generate the virtual horizontal DSI using two vertically oriented stereo cameras. Mounting two vertically oriented stereo cameras next to each other may capture two images that may be utilized as "left" and "right" images to generate a horizontal DSI. For example, the top image captured by the vertically oriented stereo camera on a left side may be used as the left image and the top image captured by the vertically oriented stereo camera on the right side may be used as the right image for training the CNN. Similarly, the bottom image captured by the vertically oriented stereo camera on a left side may be used as the left image and the bottom image captured by the vertically oriented stereo camera on the right side may be used as the right image for training the CNN. If the vertically oriented stereo cameras are mounted at the same level and the distance between the two vertically oriented stereo cameras is known, the images captured by the both the stereo cameras may be used to determine a horizontal DSI.

The "left" and the "right" images (e.g., the two images captured by the top cameras of the vertically oriented stereo cameras) may each be used as a data source for training the CNN. The vertical DSI from one of the vertically oriented stereo camera pairs may be used as another data source for training the CNN. In an example, the vertical DSI may be generated by performing SGM. In response to the left and right images and the vertical DSI, the CNN may be trained to predict the horizontal DSI (e.g., self-supervised training).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation).

The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras (e.g., a stereo camera). The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
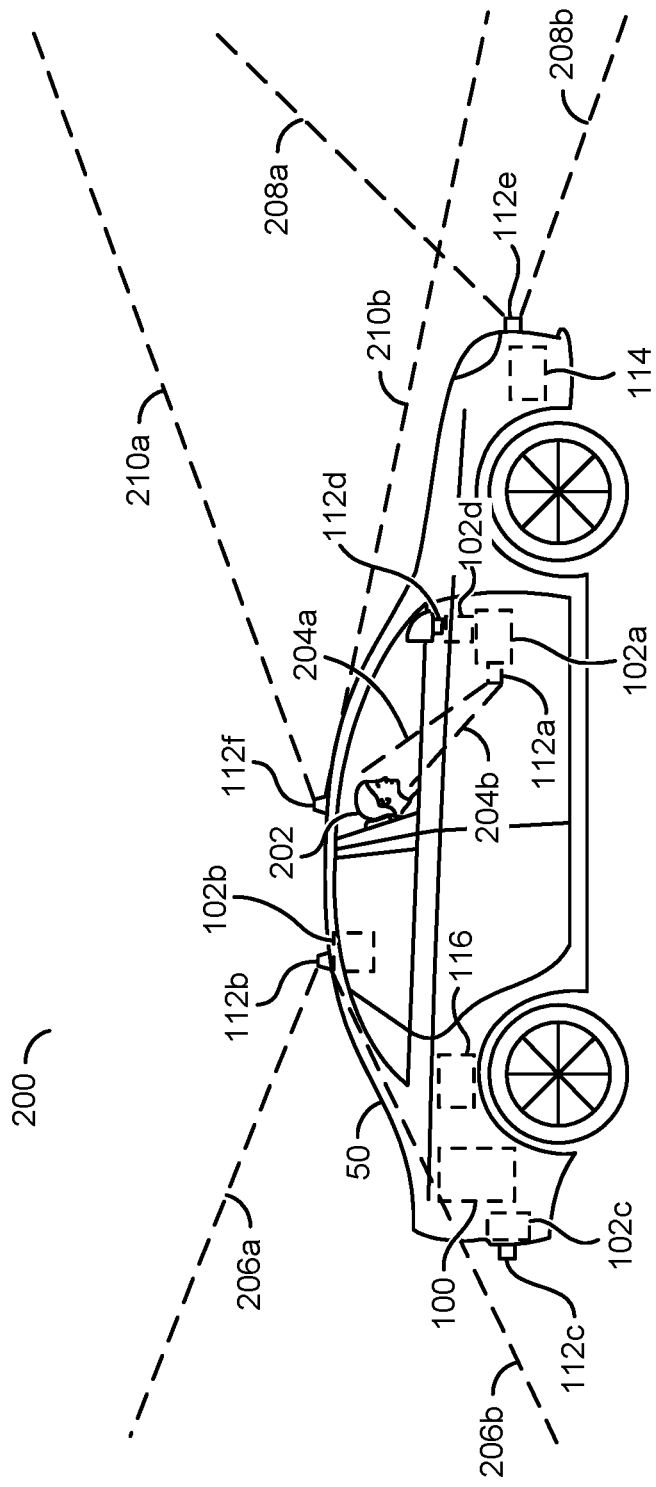
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
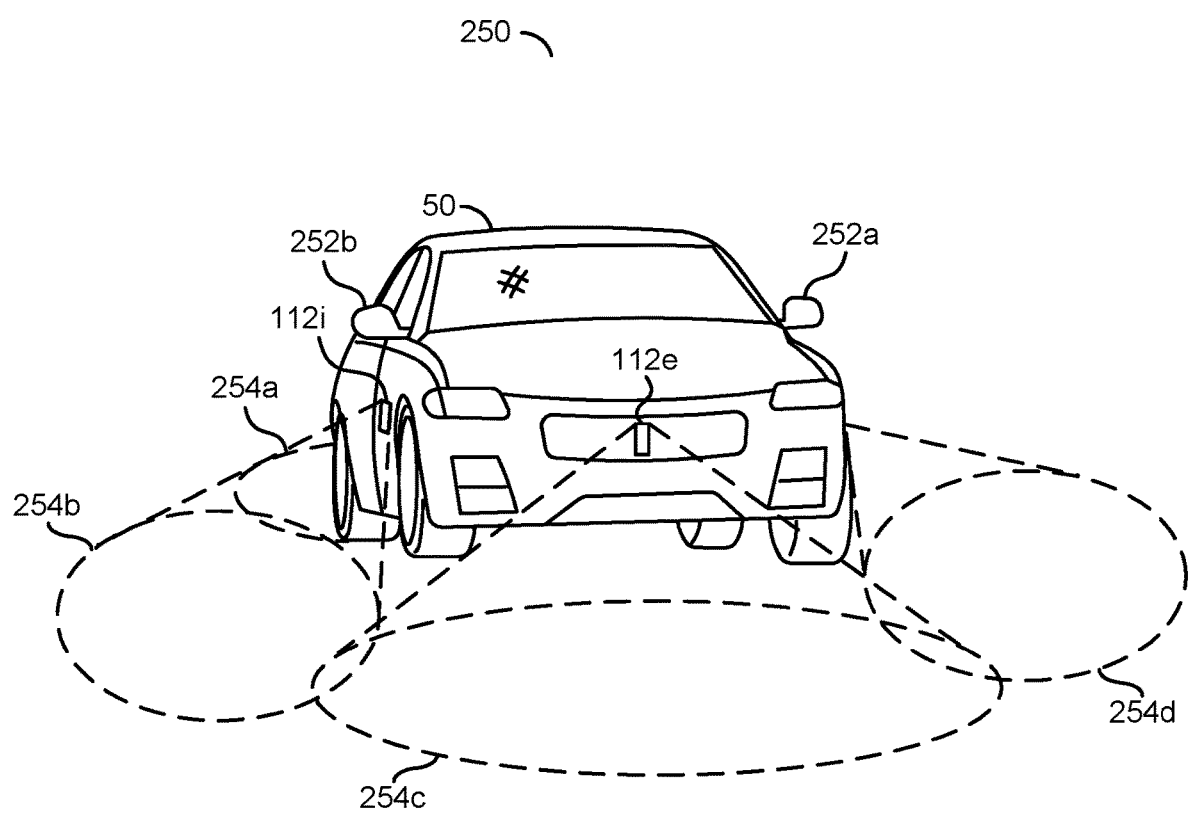
FIG. 3 is a diagram illustrating a vehicle camera system capturing an all-around view.

Referring to FIG. 3, a diagram illustrating the vehicle camera system 100 capturing an all-around view is shown. An external view 250 of the ego vehicle 50 is shown. External side view mirrors 252a-252b are shown. The side view mirror 252a may be a side view mirror on the driver side of the ego vehicle 50. The side view mirror 252b may be a side view mirror on the passenger side of the ego vehicle 50. The camera lens 112e is shown on the front grille of the ego vehicle 50. The camera lens 112i is shown on a passenger side of the ego vehicle 50. The camera lens 112i is shown below the passenger side view mirror 252b. Similarly, one of the lenses 112a-112n may be implemented at a level below the driver side view mirror 252a (not visible from the perspective of the external view 250 shown).

An all-around view 254a-254d is shown. In an example, the all-around view 254a-254d may enable an all-around view (AVM) system. The AVM system may comprise four cameras (e.g., each camera may comprise a combination of one of the lenses 112a-112n (or a stereo pair of the lenses 112a-112n) and one of the capture devices 102a-102n). In the perspective shown in the external view 250, the lens 112e and the lens 112i may each be one of the four cameras and the other two cameras may not be visible. In an example, the lens 112e may be a camera located on the front grille of the ego vehicle 50, one of the cameras may be on the rear (e.g., over the license plate), the lens 112i may be located below the side view mirror 252b on the passenger side and one of the cameras may be located below the side view mirror 252a on the driver side. The arrangement of the cameras may be varied according to the design criteria of a particular implementation.

Each camera providing the all-around view 254a-254d may implement a fisheye lens (e.g., the lens 112e and the lens 112i shown may be fisheye lenses) and may capture a video frame with a 180 degrees angular aperture. The all-around view 254a-254d is shown providing a field of view coverage all around the ego vehicle 50. For example, the portion of the all-around view 252a may provide coverage for a rear of the ego vehicle 50, the portion of the all-around view 252b may provide coverage for a passenger side of the ego vehicle 50, the portion of the all-around view 252c may provide coverage for a front of the ego vehicle 50 and the portion of the all-around view 252d may provide coverage for a driver side of the ego vehicle 50. Each portion of the all-around view 252a-252d may be one field of view of a camera mounted to the ego vehicle 50. Each portion of the all-around view 254a-254d may be dewarped and stitched together by the processors 106a-106n to provide an enhanced video frame that represents a top-down view near the ego vehicle 50. The processors 106a-106n may modify the top-down view based on the all-around view 254a-254d to provide a representation of a bird's-eye view of the ego vehicle 50.

The lens 112e and the lens 112i shown on the ego vehicle 50 may provide a representative example of the mechanism for image acquisition by the capture devices 102a-102n. In one example, the capture devices 102a-102n may be implemented as monocular cameras. In another example, the capture devices 102a-102n may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the ego vehicle 50. The locations of the capture devices 102a-102n on the ego vehicle 50 and/or the orientation of the capture devices 102a-102n may be varied according to the design criteria of a particular implementation.

The all-around view 254a-254d may be captured by four of the capture devices (e.g., 102a-102d) implemented by camera system 100. In some embodiments, the capture devices 102a-102d may be connected to an on-board processing system (e.g., a PC, a FPGA, a DSP, an ASIC, etc.). For example, the capture devices 102a-102d may be connected to the processors 106a-106n. The video processing pipeline 156 may receive the captured video frames (e.g., images) and process the video frames to create a bird's-eye view. The processors 106a-106n may be further configured to detect special patterns (e.g., QR codes and/or textured light patterns). The processors 106a-106n may be further configured to detect image features for object detection using the computer vision operations.

In some embodiments, the all-around view 254a-254d may be presented to the driver 202 on one or more of the displays 118a-118n in real-time. The all-around view 254a-254d may assist the driver 202 by providing a representation of the position of the ego vehicle 50 with respect to nearby obstacles that may be difficult to see because of the body of the ego vehicle 50 may obstruct the view of the driver 202. When the driver 202 is performing a maneuver near an obstacle, the all-around view 254a-254d may be one useful perspective.

In some embodiments, the all-around view 254a-254d may be used by the processors 106a-106n to detect objects and/or determine a location of objects with respect to the ego vehicle 50 using computer vision operations. The results of the computer vision operations may enable the processors 106a-106n to understand the surroundings of the ego vehicle 50. The results of the computer vision operations may be used to enable autonomous driving of the ego vehicle 50. In one example, the processors 106a-106n may be configured to provide controls to various systems of the ego vehicle 50 (e.g., a drive train, a steering system, a braking system, etc.). In another example, the processors 106a-106n may be configured to provide the results of the computer vision operations to a system of the ego vehicle 50 that provides autonomous controls to the ego vehicle 50. The implementation of the autonomous control of the ego vehicle 50 may be varied according to the design criteria of a particular implementation.

The results of the computer vision operations performed using the video frames generated in response to the all-around view 254a-254d may be used to provide data for autonomous control of the ego vehicle 50. The autonomous control of the ego vehicle 50 may be configured to perform a vehicle maneuver. In one example, the vehicle maneuver may comprise backing into and/or pulling out of a parking spot. In another example, the vehicle maneuver may comprise performing parallel parking. In yet another example, the vehicle maneuver may comprise changing a lane in traffic. In still another example, the vehicle maneuver may comprise full autonomous control of the ego vehicle 50. In order to acquire the data about the objects near the ego vehicle 50, the all-around view 254a-254d may need to provide sufficient detail for object detection. For autonomous control of the ego vehicle 50, the camera system 100 may be configured to operate in various conditions (e.g., light, dark, rain, snow, sunny, etc.). The apparatus 100 may be configured to provide illumination to facilitate the detection of objects within the all-around view 254a-254d.

Figure 4:
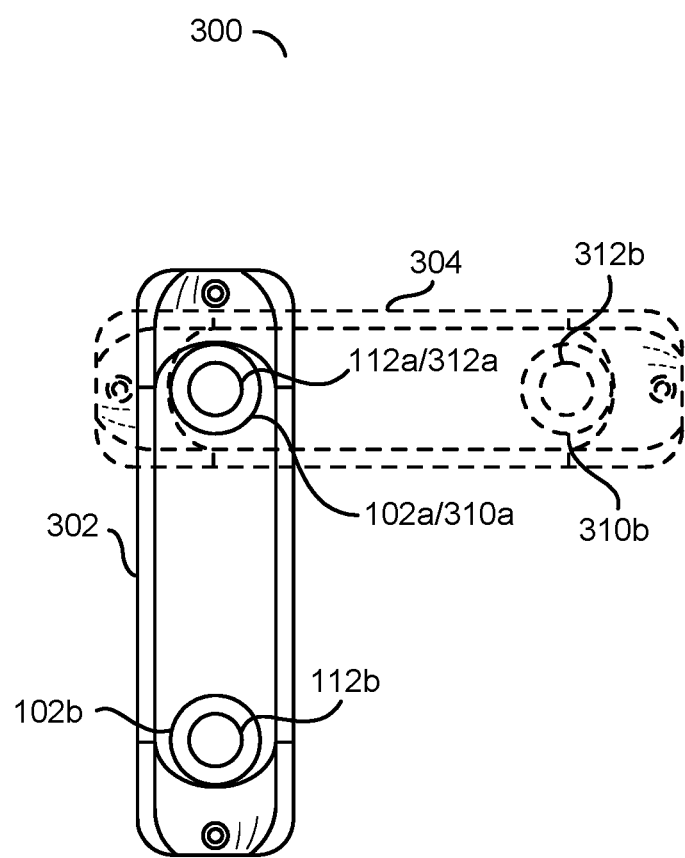
FIG. 4 is a diagram illustrating a vertically oriented stereo camera pair and a virtual horizontal stereo camera.

Referring to FIG. 4, a diagram illustrating a vertically oriented stereo camera pair and a virtual horizontal stereo camera is shown. An illustrative example 300 is shown. The illustrative example 300 may provide a visual representation of the functionality of the camera system 100.

The illustrative example 300 may comprise a stereo camera 302 and a stereo camera pair 304. The stereo camera 302 may be a vertically oriented stereo camera. The vertically oriented stereo camera 302 is shown illustrating with solid lines. The vertically oriented stereo camera 302 may be a physical camera. The stereo camera 304 may be a virtual horizontally oriented stereo camera. The virtual horizontally oriented stereo camera 304 is shown illustrated with dotted lines. The virtual horizontally oriented stereo camera 304 may be a virtual camera (e.g., not a physically present camera).

The camera system 100 may be configured to operate as if both the vertically oriented stereo camera 302 and the virtual horizontally oriented stereo camera 304 are present. However, only the vertically oriented stereo camera 302 may be implemented. The vertically oriented stereo camera 302 may operate alone. The processors 106a-106n may be configured to intelligently generate disparity images as if the virtual horizontally oriented stereo camera 304 was capturing images used to generate disparity values.

The vertically oriented stereo camera 302 may comprise a top capture device 102a and a bottom capture device 102b. The capture devices 102a-102b may each be one of the capture devices 102a-102n described in association with FIG. 1. The top capture device 102a may comprise a top lens 112a. The bottom capture device 102b may comprise a bottom lens 112b. The top lens 112a and the bottom lens 112b may each be one of the lenses 112a-112n described in association with FIG. 1.

The top capture device 102a may comprise one of the image sensors 140a-140n. The bottom capture device 102b may comprise one of the images sensors 140a-140n. While the top capture device 102a and the bottom capture device 102b may be in a vertical orientation with respect to each other (e.g., the lens 112a and the 112b may be 'stacked' vertically), the sensors 140a-140n implemented by the vertically oriented stereo camera 302 may be oriented horizontally. For example, the sensors 140a-140n may be implemented in the vertically oriented stereo camera 302 having a longer width than height. In an example, if the vertically oriented stereo camera 302 is implemented on the vehicle 50 (e.g., with the bottom lens 112b closer to the road than the top lens 112a), then the sensors 140a-140n may be implemented within the vertically oriented stereo camera 302 with the wider portion of the sensors 140a-140n parallel to the road.

The top lens 112a and the bottom lens 112b may be implemented at a predetermined distance apart from each other. The top lens 112a and the bottom lens 112b may be angled slightly inwards with respect to each other at a predetermined angle. For example, a line extending directly outwards from each of the lenses 112a-112b may eventually meet at a point in between the lenses 112a-112b. The predetermined distance and the predetermined angle of the lenses 112a-112b may be used by the disparity engine 164 to generate disparity images and/or disparity values. The disparity images generated by the vertically oriented stereo camera 302 may be vertical disparity space images (vertical DSIs).

The virtual horizontally oriented stereo camera 304 may comprise a right capture device 310a and a left capture device 310b. The right capture device 310a may comprise a right lens 312a. The left capture device 310b may comprise a left lens 312b. The right capture device 310a of the virtual horizontally oriented stereo camera 304 may be the top capture device 102a of the vertically oriented stereo camera 302. Similarly, the right lens 312a of the virtual horizontally oriented stereo camera 304 may be the top lens 112a of the vertically oriented stereo camera 302. The left capture device 310b and the left lens 312b of the virtual horizontally oriented stereo camera 304 may not exist. However, the processors 106a-106n may be configured to generate disparity images as if the left capture device 310b and the left lens 312b did exist. For example, the processors 106a-106n may emulate the virtual horizontally oriented stereo camera 304 for the purpose of generating horizontal disparity values.

The processors 106a-106n may operate as if the right lens 312a and the left lens 312b are implemented at a predetermined distance apart from each other. The processors 106a-106n may operate as if the right lens 312a and the left lens 312b are angled slightly inwards with respect to each other at a predetermined angle. For example, if the virtual horizontally oriented stereo camera 304 did exist, the predetermined distance and the predetermined angle of the lenses 312a-312b may be used by the disparity engine 164 to horizontal disparity images. The processors 106a-106n may be configured to generate virtual horizontal disparity space images (horizontal DSIs) that approximate the horizontal DSIs that would be implemented if the 304 were actually implemented.

The processors 106a-106n may use the top lens 112a (and the top capture device 102a) of the vertically oriented stereo camera 302 as the right lens 312a (and the right capture device 310a) of the virtual horizontally oriented stereo camera 304. The CNN 150 may be configured to determine what the horizontal DSIs would be if there was also the virtual left lens 312b capturing images at the predetermined distance (e.g., a horizontal distance) from the top lens 112a. Since the sensors 140a-140n of the vertically oriented capture devices 102a-102b may be horizontally oriented (e.g., longer width than height), the processors 106a-106n may operate as if the right virtual capture device 310a and the left virtual capture device 310b also had horizontally oriented image sensors 140a-140n (e.g., longer width than height with the sensors oriented parallel to the road). For example, the virtual horizontally oriented stereo camera 304 may not be merely the vertically oriented stereo camera 302 rotated ninety degrees. The sensors 140a-140n within the vertically oriented stereo camera 302 and the virtual horizontally oriented stereo camera 304 would have a different arrangement. For example, the sensors 140a-140n may have the same orientation with respect to the ground for both the vertically oriented stereo camera 302 and the virtual horizontally oriented stereo camera 304.

In the illustrative example 300, the vertically oriented stereo camera 302 may operate as the 'right' capture device 310a of the virtual horizontally oriented stereo camera 304, and the CNN module 150 may generate the virtual horizontal DSIs as if a 'left' capture device 310b were implemented. However, the camera system 100 may be similarly configured such that the vertically oriented stereo camera 302 may operate as the 'left' capture device 310a of the virtual horizontally oriented stereo camera 304, and the CNN module 150 may generate the virtual horizontal DSIs as if a 'right' capture device 310b were implemented. In the illustrative example 300, the vertically oriented stereo camera 302 may operate with the top capture device 102a being used as one of the virtual capture devices 310a for the virtual horizontally oriented stereo camera 304 (e.g., the virtual horizontally oriented stereo camera 304 may be horizontally aligned with the top lens 112a). However, the camera system 100 may be similarly configured such that the vertically oriented stereo camera 302 may operate with the bottom capture device 102b being used as one of the virtual capture devices 310a for the virtual horizontally oriented stereo camera 304 (e.g., virtual horizontally oriented stereo camera 304 may be horizontally aligned with the bottom lens 112b). The arrangement between the capture devices 102a-102b of the vertically oriented stereo camera 302 and the virtual horizontally oriented stereo camera 304 may be varied according to the design criteria of a particular implementation.

Figure 5:
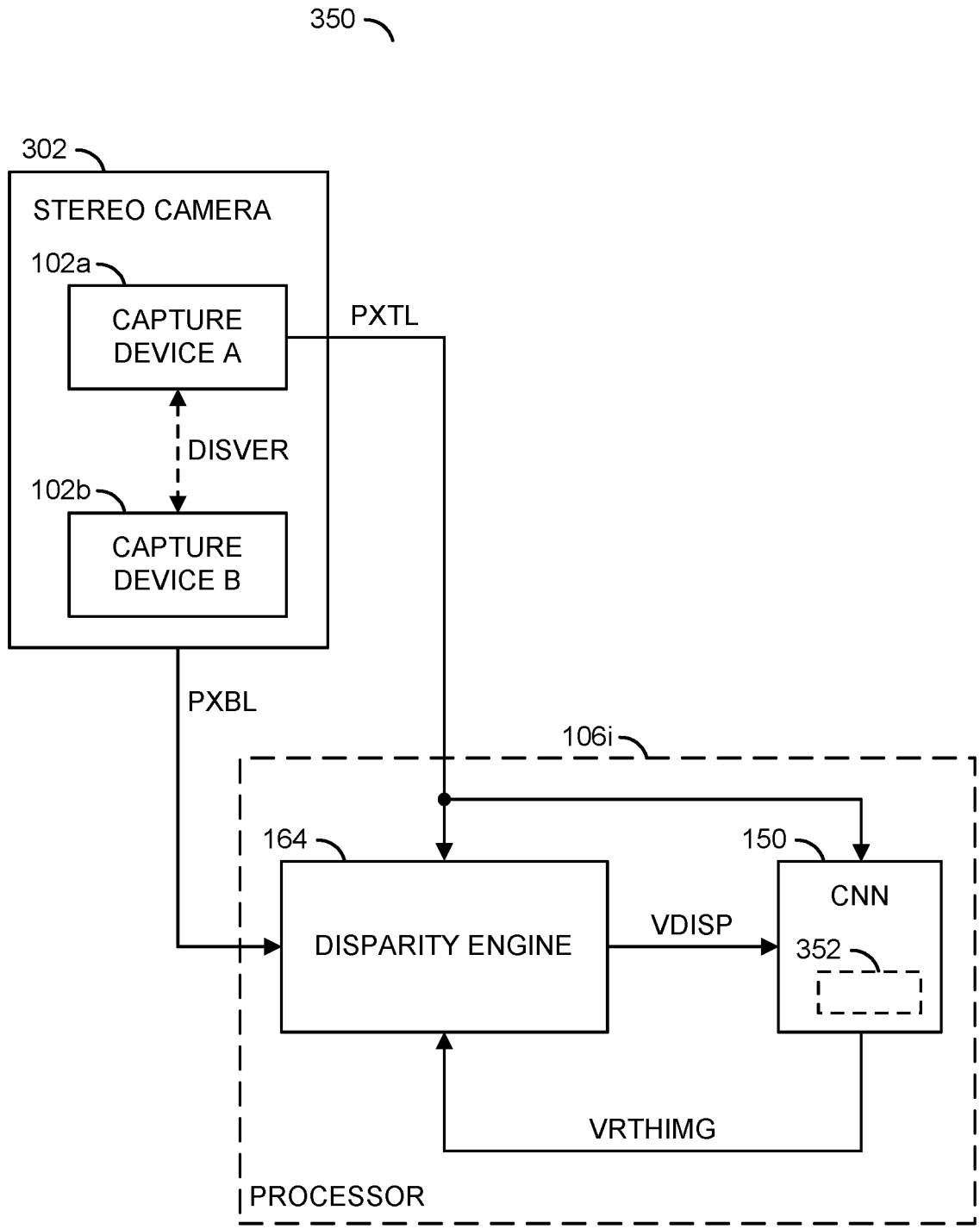
FIG. 5 is a block diagram illustrating a processor generating a virtual horizontal disparity image.

Referring to FIG. 5, a block diagram illustrating a processor generating a virtual horizontal disparity image is shown. A block diagram 350 is shown. The block diagram 350 may comprise the vertically oriented stereo camera 302 and one of the processors 106i. The block diagram 350 may illustrate the generation of the virtual horizontal DSIs. Since the virtual horizontally oriented is not physically present, no block 304 is shown. In the block diagram 350, only the processor 106i is shown. The processor 106i may be a representative example of the processors 106a-106n implemented by the camera system 100. Any number of processors 106a-106n may operate together to perform the operations and/or functions of the processor 106i shown.

The example block diagram 350 may represent the camera system 100 operating in a virtual DSI generation mode of operation. The example block diagram 350 may represent a scenario when the camera system 100 is implemented on the ego vehicle 50 (e.g., real driving scenarios). While the ego vehicle 50 is in operation, the camera system 100 may utilize the vertically oriented stereo camera 302 to capture images. For example, to capture the all-around view 254a-254d, four of the vertically oriented stereo cameras 302 may be implemented (e.g., one on the front, one on the rear, one on the driver side and one on the passenger side of the ego vehicle 50). For example, the CNN module 150 may analyze vertical DSIs and/or generate the virtual horizontal DSIs for each of the four vertical oriented stereo cameras.

In order to operate in real-world driving scenarios, the CNN module 150 may be trained using stereo pairs of horizontal images and the horizontal DSIs generated in response to the stereo pairs of horizontal images (e.g., operate in a training mode of operation). Details of the training of the CNN module 150 may be described in association with FIGS. 6-7. For example, the block diagram 350 may provide an implementation of the camera system 100 after the CNN module 150 has been trained to generate the virtual horizontal DSIs.

The vertically oriented stereo camera 302 is shown comprising the top capture 102a and the bottom capture device 102b. The vertically oriented stereo camera 302 may comprise other components (not shown). A distance (e.g., DISVER) is shown between the top capture device 102a and the bottom capture device 102b. The distance DISVER may be the predetermined distance between the lenses 112a-112b of the vertically oriented stereo camera 302. The distance DISVER may be part of the calibration data used by the disparity engine 164 (e.g., along with the angle of the capture devices 102a-102b with respect to each other). The vertical DSI may be generated by the processors 106a-106n based on the distance DISVER between the top lens 112a and the bottom lens 112b.

The vertically oriented stereo camera 302 is shown generating a signal (e.g., PXTL) and a signal (e.g., PXBL). The signal PXTL may comprise pixel data (or video frames) generated by the vertically oriented stereo camera 302. In an example, the signal PXTL may be generated by the top capture device 102a. The signal PXBL may comprise pixel data (or video frames) generated by the vertically oriented stereo camera 302. In an example, the signal PXBL may be generated by the bottom capture device 102b. The signal PXTL and the signal PXBL may be presented to the processors 106a-106n. In an example, the signal PXTL and the signal PXBL may be communicated as the signal FRAMES_A-FRAMES_N shown in association with FIG. 1.

The CNN module 150 and the disparity engine 164 of the processor 106i are shown. The disparity engine 164 may receive the signal PXTL and the signal PXBL generated by the stereo camera 302. The disparity engine 164 may generate a signal (e.g., VDISP). The signal VDISP may comprise the vertical DSI. The signal VDISP may be generated in response to the signal PXTL and the signal PXBL. In an example, the disparity engine 164 may have prior access to the calibration data (e.g., the distance DISVER and the pre-determined angle between the lenses 112a-112b) of the vertically oriented stereo camera 302. In one example, the look-up table 170 may comprise the calibration data about the lenses 112a-112b of the vertically oriented stereo camera 302 and/or other capture devices 102a-102n implemented by the ego vehicle 50. In another example, the disparity engine 164 may implement a cache memory for storing the calibration data about the lenses 112a-112b of the vertically oriented stereo camera 302 and/or other capture devices 102a-102n implemented by the ego vehicle 50. The disparity engine 164 may calculate the vertical DSIs in response to the distance DISVER, the signal PXTL, the signal PXBL and/or the pre-determined angle between the lenses 112a-112b. The disparity engine 164 may present the signal DISVER to the CNN module 150.

The CNN module 150 may comprise a block (or circuit) 352. The circuit 352 may comprise a neural network model. The neural network model 352 may be a trained neural network model. For example, the trained neural network model 352 may be the result of training the CNN module 150 when the CNN module 150 operates in a training mode of operation (e.g., to be described in association with FIGS. 6-8). The trained neural network model 352 may enable the CNN module 150 to operate in the virtual DSI generation mode of operation. The trained neural network model 352 may be configured to generate virtual DSIs. In one example, the trained neural network model 352 may be a directed acyclic graph with parameters and/or weighting values pre-programmed and/or pre-defined for generating the virtual horizontal DSIs. In some embodiments, the trained neural network 352 may be a quantized neural network (e.g., a reduced size neural network configured to operate on an edge device that has been modeled based on a full size neural network that was trained offline).

The CNN module 150 is shown receiving the signal PXTL and the signal VDISP. The CNN module 150 may generate a signal (e.g., VRTHIMG). The signal VRTHIMG may be a virtual horizontal DSI. The signal VRTHIMG may be generated by the CNN module 150 in response to the pixel data PXTL and the vertical DSI signal VDISP. For example, the trained neural network 352 may be configured to generate the virtual horizontal DSI in response to pixel data from the vertically oriented stereo camera 302 and the vertical DSI generated from the pixel data from both capture devices 102a-102b of the vertically oriented stereo camera 302. The CNN module 150 may fill in missing disparity values to generate the virtual horizontal DSI VRTHIMG. The CNN module 150 may be trained to fill in the missing disparity values using training data. For example, the CNN module 150 may be configured to generate the virtual horizontal DSI signal VRTHIMG in response to the pixel data signal PXTL and the vertical DSI signal VDISP based on an artificial intelligence model generated from training data.

The signal VRTHIMG may be generated to approximate a horizontal disparity image generated using images captured by the virtual horizontally oriented stereo camera 304 shown in association with FIG. 4. The virtual horizontal disparity image VRTHIMG may be generated as if the lens 312b was implemented at a distance (e.g., DISHOR) from the top lens 112a of the vertically oriented stereo camera 302. For example, the CNN module 150 may be configured to generate the virtual horizontal DSI VRTHIMG that predicts (e.g., provides an intelligent estimation of) what a horizontal DSI would look like (e.g., predict the disparity values) if the disparity engine 164 received the signal PXTL as one image (e.g., a right image) and another horizontal image (e.g., a left image). In the example shown, the CNN module 150 may generate the virtual horizontal DSI VRTHIMG in response to the signal VDISP, the training data and the top pixel data PXTL. In some embodiments, the CNN module 150 may be trained to generate the virtual horizontal DSI VRTHIMG in response to the signal VDISP, the training data and the bottom pixel data PXBL.

In the block diagram 350, the signal VRTHIMG is shown being communicated by the CNN module 150 to the disparity engine 164. For example, the disparity engine 164 may use the virtual horizontal DSI to perform calculations and/or perform comparisons with the vertical DSI. In some embodiments, the virtual horizontal DSI may be used internally by the CNN module 150 (e.g., to perform object detection and/or object classification, etc.). In some embodiments, the virtual horizontal DSI may be used by other components of the processors 106a-106n. The components of the camera system 100 that receive and/or utilize information from the signal VRTHIMG may be varied according to the design criteria of a particular implementation.

Figure 6:
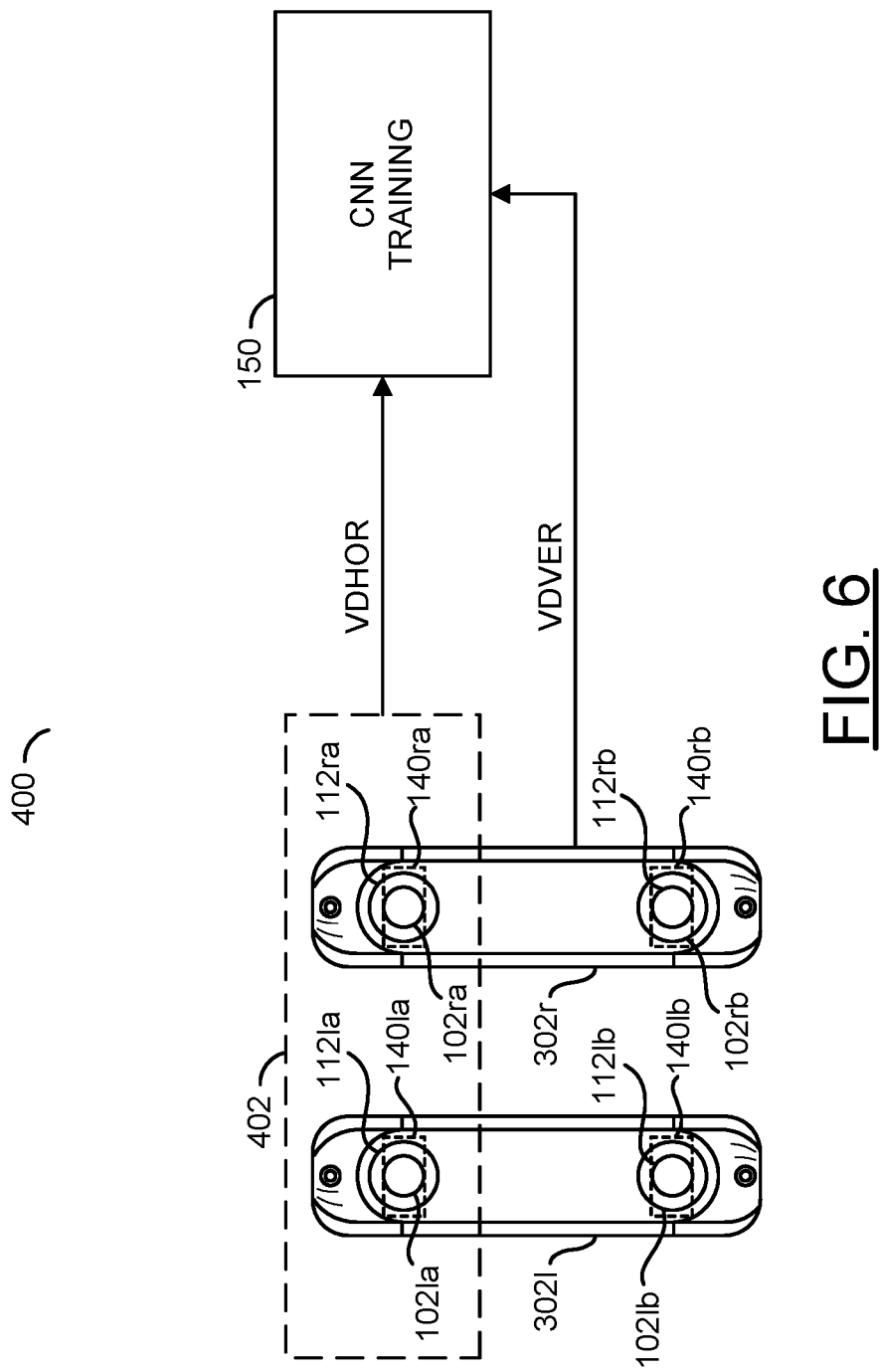
FIG. 6 is a block diagram illustrating training a convolutional neural network training using data from two vertically oriented stereo camera pairs.

Referring to FIG. 6, a block diagram illustrating training a convolutional neural network training using data from two vertically oriented stereo camera pairs is shown. A training scenario 400 is shown. The training scenario 400 may comprise a left vertically oriented stereo camera 302l, a right vertically oriented stereo camera 302r and the CNN module 150. In the example shown, the CNN module 150 may be in a training mode of operation.

The left vertically oriented stereo camera 302l and the right vertically oriented stereo camera 302r may be arranged in parallel to each other (e.g., at the same height and at the same angle to each other). For example, if the left vertically oriented stereo camera 302l and the right vertically oriented stereo camera 302r are implemented on the ego vehicle 50, the left vertically oriented stereo camera 302l and the right vertically oriented stereo camera 302r may be arranged such that the bottom of each stereo camera 302l-302r is generally perpendicular to the ground.

The left vertically oriented stereo camera 302l may comprise the top capture device 102la and the bottom capture device 102lb. The top capture device 102la may comprise the lens 112la and the sensor 140la. The bottom capture device 102lb may comprise the lens 112lb and the sensor 140lb. The right vertically oriented stereo camera 302r may comprise the top capture device 102ra and the bottom capture device 102rb. The top capture device 102ra may comprise the lens 112ra and the sensor 140ra. The bottom capture device 102rb may comprise the lens 112rb and the sensor 140lb. The left vertically oriented stereo camera 302l may have a similar implementation as the right vertically oriented camera 302r. In some embodiments, the left vertically oriented stereo camera 302l may be the same device as the right vertically oriented stereo camera 302r (e.g., two implementations of the same make/model of stereo camera).

The sensors 140la-140lb and the sensors 140ra-140rb may each have the same orientation. The orientation of the sensors 140la-140lb and the sensors 140ra-140rb may be a wide aspect ratio (e.g., a longer width than height). The longer width of the sensors 140la-140lb and the sensors 140ra-140rb may be implemented parallel to the road. For example, implementing the longer width of the sensors 140la-140lb and the sensors 140ra-140rb parallel to the road may enable a wider field of view in the direction of travel of the ego vehicle 50 (e.g., when the vertically oriented stereo cameras 302l-302r are implemented on a driver side or passenger side of the ego vehicle 50).

The right vertically oriented stereo camera 302r is shown presenting a signal (e.g., VDVER). The signal VDVER may comprise the pixel data generated by the capture devices 102ra-102rb. The signal VDVER may comprise data used to generate the vertical DSI. For example, the signal VDVER may be generated by the disparity engine 164 (not shown). The signal VDVER may be presented to the CNN module 150. In the example shown, the right vertically oriented stereo camera 302r may generate the signal VDVER. In another example, the left vertically oriented stereo camera 302l may generate the signal VDVER. Generally, for training the CNN module 150, the vertical DSI from only one of the vertically oriented stereo cameras 302*l*-302*r* may be used.

A dotted box 402 is shown. The dotted box 402 may represent a virtual horizontally oriented stereo camera. The virtual horizontally oriented stereo camera 402 may comprise the top left capture device 102*la* from the left vertically oriented stereo camera 302*l* and the top right capture device 102*ra* from the right vertically oriented stereo camera 302*r*. In some embodiments, the virtual horizontally oriented stereo camera 402 may comprise the bottom left capture device 102*lb* of the left vertically oriented stereo camera 302*l* and the bottom right capture device 102*rb* from the right vertically oriented stereo camera 302*r*. For training the CNN module 150, one capture device from each of the vertically oriented stereo cameras 302*l*-302*r* that are directly across from each other may be used.

To effectively create the virtual horizontally oriented stereo camera 402 from the capture devices 102*la*-102*lb* and the capture devices 102*ra*-102*rb* of the pair of vertically oriented stereo cameras 302*l*-302*r*, the horizontal distance between the vertically oriented stereo cameras 302*l*-302*r* may be known. In one example, the distance between the capture devices 102*la*-102*lb* (e.g., DISVER) and the distance between the capture devices 102*ra*-102*rb* (e.g., DISVER) may be the same distance (e.g., DISHOR) between the two capture devices used to create the virtual horizontally oriented stereo camera 402 (e.g., the capture device 102*la* and the capture device 102*ra*). In another example, the distance between the capture devices 102*la*-102*lb* (e.g., DISVER) and the distance between the capture devices 102*ra*-102*rb* (e.g., DISVER) may be a different distance DISHOR (but approximately close to the distance DISVER) between the two capture devices used to create the virtual horizontally oriented stereo camera 402 (e.g., the capture device 102*la* and the capture device 102*ra*).

In the example shown, the virtual horizontally oriented stereo camera 402 may comprise the capture device 102*la* and the capture device 102*ra*. While the arrangement of the capture devices 102*la* and 102*ra* may be horizontal with respect to each other, the orientation of the sensor 140*la* and the sensor 140*ra* may be the same. For example, the sensors 140*la*-140*lb* and the sensors 140*ra*-140*rb* may be oriented with the wider edge parallel to the ground. For example, with respect to the pair of vertically oriented stereo cameras 302*l*-302*r* the respective sensors 140*la*-140*lb* and the sensors 140*ra*-140*rb* may be wider at the bottom. Since the virtual horizontally oriented stereo camera 402 uses the sensor 140*la* and the sensor 140*ra* (or the sensor 140*lb* and the sensor 140*rb*), the wider edge of the sensors may also be parallel to the ground (e.g., the virtual horizontally oriented capture device 402 may not merely operate as if one of the vertically oriented stereo cameras 302*l*-302*r* has been rotated 90 degrees).

The virtual horizontally oriented stereo camera 402 is shown presenting a signal (e.g., VDHOR). The signal VDHOR may comprise the pixel data generated by the capture devices 102*la*-102*ra*. The signal VDHOR may comprise data used to generate the horizontal DSI. For example, the signal VDHOR may be generated by the disparity engine 164 (not shown). The signal VDHOR may be presented to the CNN module 150. In the example shown, the signal VDHOR may be generated in response to the pixel data generated by the capture devices 102*la*-102*ra*. In another example, signal VDHOR may be generated in response to the pixel data generated by the capture devices 102*lb*-102*rb*. Generally, for training the CNN module 150, the horizontal DSI may be provided by using one capture device from each of the two vertically oriented stereo cameras 402.

Figure 7:
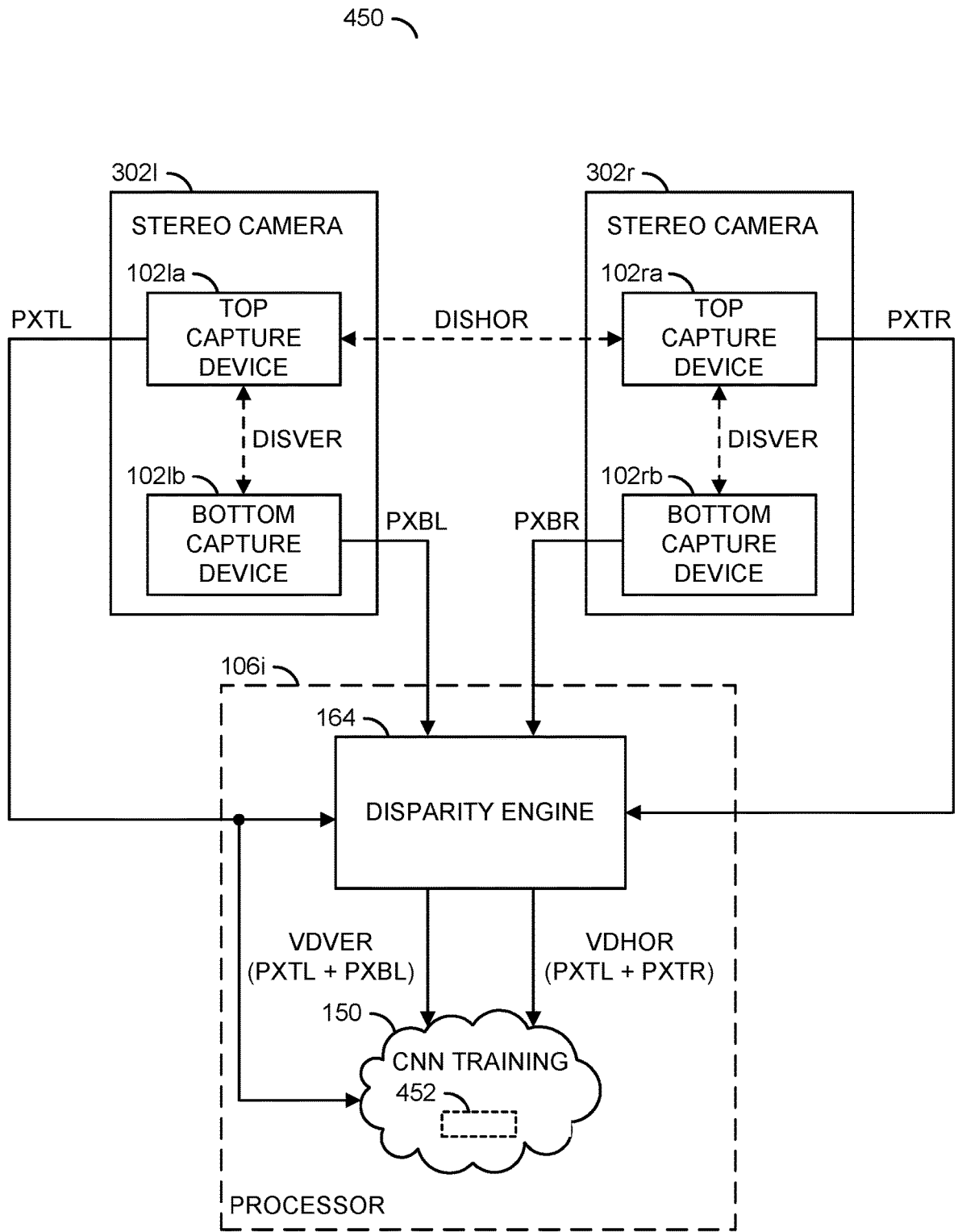
FIG. 7 is a block diagram illustrating training a convolutional neural network using pixel data from a top camera of two vertically oriented stereo camera pairs.

Referring to FIG. 7, a block diagram illustrating training a convolutional neural network using pixel data from a top camera of two vertically oriented stereo camera pairs is shown. A training block diagram 450 is shown. The training block diagram 450 may comprise the vertically oriented stereo camera 302*l*, the vertically oriented stereo camera 302*r* and/or the processor 106*i*. The processor 106*i* may be a representative example of any one or more of the processors 106*a*-106*n*.

The vertically oriented stereo camera 302*l* may comprise the top capture device 102*la* and the bottom capture device 102*lb*. The distance DISVER is shown between the capture devices 102*la*-102*lb*. The signal DISVER may be used by the disparity engine 164 to calculate vertical DSIs from pixel data generated by the stereo camera 302*l*. The vertically oriented stereo camera 302*r* may comprise the top capture device 102*ra* and the bottom capture device 102*rb*. The distance DISVER is shown between the capture devices 102*ra*-102*rb*. The signal DISVER may be used by the disparity engine 164 to calculate vertical DSIs from pixel data generated by the stereo camera 302*r*.

The distance DISVER for the vertically oriented stereo camera 302*l* may be approximately equal to the distance DISVER for the vertically oriented stereo camera 302*r*. For example, the camera model of the devices used to implement each of the pair of stereo cameras 302*l*-302*r* may be the same (e.g., same specifications, same dimensions, same capabilities, etc.). The distance DISHOR is shown between the top capture device 102*la* and the top capture device 102*ra*. In some embodiments, the distance DISHOR may be equal (or approximately equal) to the distance DISVER.

The vertically oriented stereo camera 302*l* may generate the signal PXTL and the signal PXBL. For example, the signal PXTL may comprise the pixel data generated by the top left capture device 102*la* and the signal PXBL may comprise the pixel data generated by the bottom left capture device 102*lb*. In some embodiments, the sensors 140*la*-140*lb* may generate video frames and the signal PXTL and the signal PXBL may comprise video frames. The vertically oriented stereo camera 302*r* may generate a signal (e.g., PXTR) and a signal (e.g., PXBR). For example, the signal PXTR may comprise the pixel data generated by the top right capture device 102*ra* and the signal PXBR may comprise the pixel data generated by the bottom right capture device 102*rb*. In some embodiments, the sensors 140*ra*-140*rb* may generate video frames and the signal PXTR and the signal PXBR may comprise a video frames. The signal PXTL and the signal PXBL may be communicated from the vertically oriented stereo camera 302*l* to the processor 106*i*. The signal PXTR and the signal PXBR may be communicated from the vertically oriented stereo camera 302*r* to the processor 106*i*.

The processor 106*i* is shown comprising the disparity engine 164 and the CNN module 150. The other components of the processors 106*a*-106*n* may not be shown. The CNN module 150 may be configured to operate in a training mode of operation. The CNN module 150 is shown comprising a block (or circuit) 452. The circuit 452 may comprise a neural network model. The neural network model 452 may be trained in response to the training data generated when the CNN module 150 operates in the training mode of operation. In one example, the neural network model 452 may be a directed acyclic graph.

The disparity engine 164 may be configured to receive the signal PXTL and the signal PXBL from the left vertically oriented stereo camera 302*l* (e.g., pixel data and/or video frames). The disparity engine 164 may be configured to receive the signal PXTR and the signal PXBR from the right vertically oriented stereo camera 302*r* (e.g., pixel data and/or video frames). The disparity engine 164 may be configured to generate vertical DSIs in response to the vertical pair of pixel data from the signal PXTL and the signal PXBL (e.g., from the left stereo camera 302*l*). The disparity engine 164 may be configured to generate vertical DSIs in response to the vertical pair of pixel data from the signal PXTR and the signal PXBR (e.g., from the right stereo camera 302*r*). The disparity engine 164 may be configured to generate horizontal DSIs in response to the pixel data from the signal PXTR (e.g., from the top capture device 102*ra* of the right vertically oriented stereo camera 302*r*) and the signal PXTL (e.g., from the top capture device 102*la* of the left vertically oriented stereo camera 302*l*).

The disparity engine 164 may be configured to generate the signal VDVER and the signal VDHOR. The signal VDVER and the signal VDHOR may be presented to the CNN module 150. The signal VDVER may comprise the vertical DSIs generated in response to the pixel data PXTL and the pixel data PXBL. In some embodiments, the signal VDVER may comprise similar vertical DSIs as the signal VDISP shown in association with FIG. 5. The signal VDHOR may comprise the horizontal DSIs generated in response to the pixel data PXTL and the pixel data PXTR. In the example shown, the signal VDVER may be generated from the left vertically oriented stereo camera 302*l* and the signal VDHOR may be generated from the two top capture devices 102*la*-102*ra*. In some embodiments, the disparity engine 164 may be configured to generate the signal VDVER in response to the pixel data PXTR and the pixel data PXBR from the right vertically oriented stereo camera 302*r*. In some embodiments, the disparity engine 164 may be configured to generate the signal VDHOR in response to the pixel data from the two bottom capture devices 102*lb*-102*rb*. The combination of capture device used to generate the vertical and horizontal DSIs may be varied according to the design criteria of a particular implementation.

In the training mode of operation, the CNN module 150 may be trained using the signal VDVER and the signal VDHOR as training data. The training using the signal VDVER and the signal VDHOR may enable the neural network model 452 analyze many examples of vertical DSIs and horizontal DSIs. In one example, training the neural network model 452 may determine and/or calculate parameters and/or weighting values for a directed acyclic graph. In some embodiments, the training data may further comprise the pixel data (or video frames) from one of the capture devices used by the disparity engine 164 to generate the vertical DSI signal VDVER. In the example shown, the signal VDVER is generated in response to the signal PXTL and the signal PXBL and the signal PXTL may be provided to the CNN module 150 as part of the training data.

The CNN module 150 may be trained to fill in missing disparity values when presented with the signal PXTL and the signal VDVER by using the signal VDHOR as a ground truth data point. The signal PXTL may comprise real-world (e.g., labeled training data) of top capture device pixel data (or video frames). The signal PXTL may provide ground truth data for top pixel data (similarly, bottom pixel data may be used) for training the neural network model 452. For example, when the CNN module 150 is operating in the virtual DSI mode of operation, data similar to the signal PXTL may be an input to the CNN module 150.

The signal VDVER may comprise real-world examples (e.g., labeled training data) of vertical DSIs. In the example shown, the left vertically oriented stereo camera 302*l* may provide the pixel data for the top and bottom image used by the disparity engine 164 to generate the vertical DSI. The signal VDVER may provide ground truth data for vertical DSIs for training the neural network model 452. For example, when the CNN module 150 is operating in the virtual DSI generation mode of operation, data similar to the signal VDVER (e.g., the signal VDISP) may be an input to the CNN module 150. The neural network model 452 may be trained to generate the virtual horizontal DSIs based on inputs from real-world examples of vertical DSIs captured by one or more of the vertically oriented stereo cameras 302*l*-302*r*.

The signal VDHOR may comprise real-world examples (e.g., labeled training data) of horizontal DSIs. In the example shown, the left vertically oriented stereo camera 302*l* may provide the pixel data for the left image and the vertically oriented stereo camera 302*r* may provide the pixel data for the right image used by the disparity engine 164 to generate the horizontal DSI. The signal VDHOR may provide ground truth data for horizontal DSIs for training the neural network model 452. For example, when the CNN module 150 is operating in the virtual DSI generation mode of operation, data similar to the signal VDHOR (e.g., the signal VRTHIMG) may be an output of the CNN module 150. The neural network model 452 may be trained to generate the virtual horizontal DSIs based on inputs from real-world examples of horizontal DSIs captured by one capture device from each of the vertically oriented stereo cameras 302*l*-302*r*.

When the camera system 100 is operating in the virtual DSI generation mode of operation (e.g., as shown in association with FIGS. 4-5), only one of the vertically oriented stereo cameras 302*l*-302*r* may be implemented (e.g., the vertically oriented stereo camera 302 as shown in association with FIG. 4). The CNN module 150 may receive input similar to the signal VDVER as input (e.g., comprising pixel data from a top and bottom capture device). In the training mode of operation, the vertically oriented stereo camera 302*l* may act as the lone vertically oriented stereo camera 302 (e.g., by providing the pixel data PXTL for a top image and the pixel data PXTB for a bottom image that may be used by the disparity engine 164 to create a vertical DSI). When the camera system 100 is operating in the virtual DSI generation mode of operation, the CNN module 150 may be configured to generate the virtual horizontal disparity images (e.g., the signal VRTHIMG). In the training mode of operation, the CNN module 150 may receive the real-world horizontal DSI that the CNN module 150 may predict when operating in the virtual DSI generation mode of operation. In the training mode of operation for the CNN module 150, the top capture device 102*la* may operate as the virtual capture device 310*a* and the top capture device 102*ra* may operate as the virtual capture device 310*b* of the virtual horizontally oriented stereo camera 304 shown in association with FIG. 4.

Figure 8:
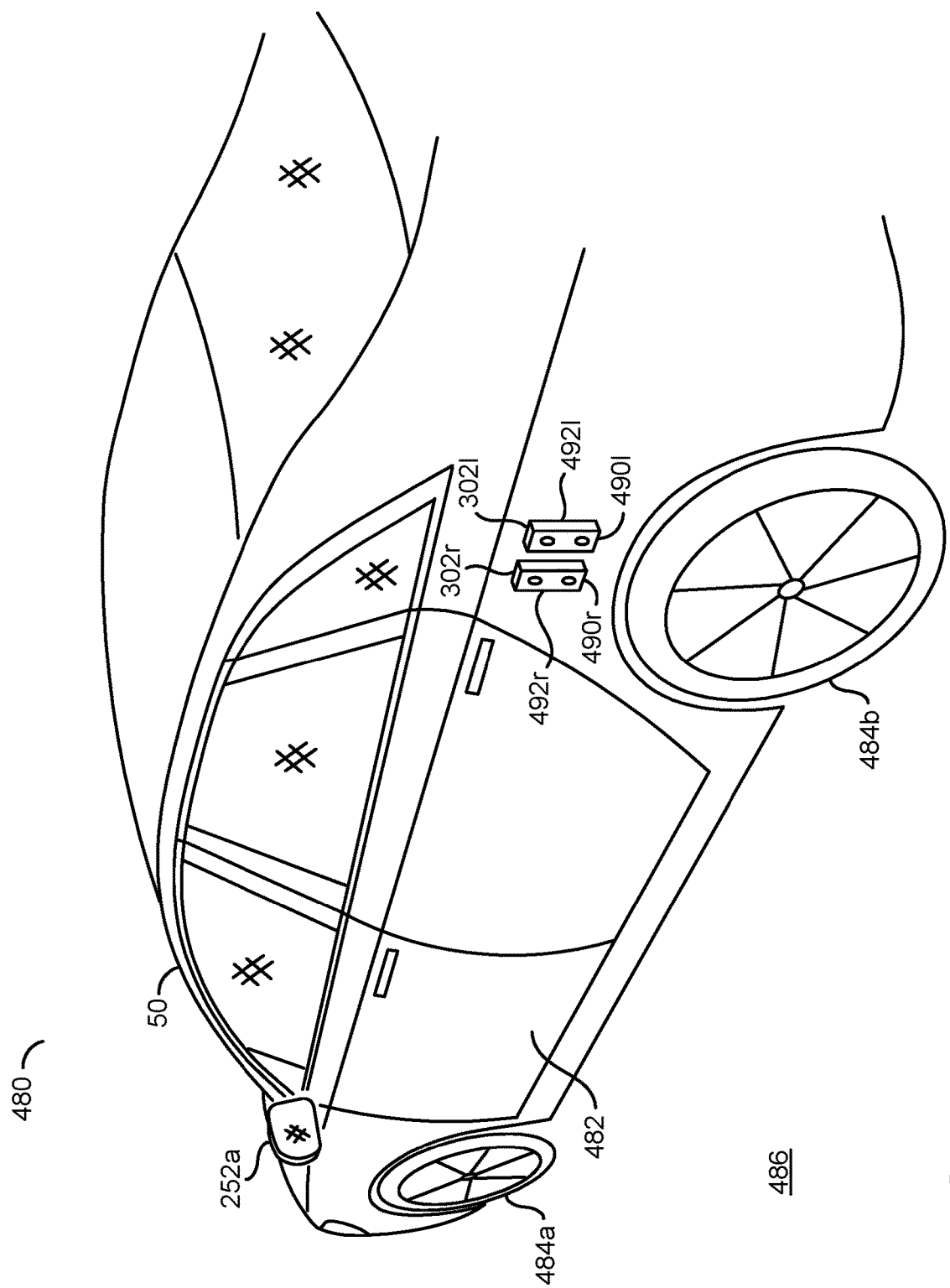
FIG. 8 is a diagram illustrating two vertically oriented stereo camera pairs implemented on a vehicle for training a convolutional neural network.

Referring to FIG. 8, a diagram illustrating illumination provided by an illumination device is shown. An external view 480 of the ego vehicle 50 is shown. The external view 480 may comprise a view of a driver side 482 of the ego vehicle 50. The driver side view mirror 252*a* is shown extending from the driver side 482 of the ego vehicle 50. A front wheel 484*a* and a rear wheel 484*b* of the driver side 482 of the ego vehicle 50 is shown. The ground 486 is shown next to the ego vehicle 50. In the example shown, the vehicle 50 may be set up to enable the CNN module 150 to operate in the training mode of operation.

A pair of vertically oriented stereo cameras 302l-302r is shown. The pair of vertically oriented stereo cameras 302l-302r may be implemented on the driver side 482 of the ego vehicle 50. In the example shown, the pair of vertically oriented stereo cameras 302l-302r may be configured to capture images outward from the driver side 482 of the ego vehicle 50. For example, the image data captured by the pair of vertically oriented stereo cameras 302l-302r may be similar to what a person would see if standing next to the driver side 482 of the ego vehicle 50 and looking away from the ego vehicle 50. In the example shown, the pair of vertically oriented stereo cameras 302l-302r may be installed at a location above the rear wheel 484b. Generally, the pair of vertically oriented stereo cameras 302l-302r may be located anywhere on the driver side 482 of the ego vehicle (e.g., on the doors, over the front wheel 484a, on the driver side mirror 252a, etc.). The location of the pair of vertically oriented stereo cameras 302l-302r may be varied according to the design criteria of a particular implementation.

The pair of vertically oriented stereo cameras 302l-302r is shown mounted on the driver side 482 of the ego vehicle 50 in parallel to each other. The vertically oriented stereo camera 302l is shown having a width 490l and a height 492l. The vertically oriented stereo camera 302r is shown having a width 490r and a height 492r. The vertical orientation may comprise the widths 490l-490l being less than the heights 492l-492r. The vertical orientation may comprise the lenses 112la-112ra being located above the respective lenses 112lb-112lr. The vertical orientation may comprise the pair of vertically oriented stereo cameras 302l-302r being oriented perpendicular to the ground 486 (e.g., the lengths 492l-492r being perpendicular to the ground 486).

Since the pair of vertically oriented stereo cameras 302l-302r are installed on the ego vehicle 50, the CNN module 150 may be trained as described in association with FIG. 7. To enable training, the pair of vertically oriented stereo cameras 302l-302r may be mounted relatively close to each other. For example, the distance between the pair of vertically oriented stereo cameras 302l-302r may be approximately the distance DISHOR. To enable training, the pair of vertically oriented stereo cameras 302l-302r may be located at the same distance from the ground 486. For example, the pair of vertically oriented stereo cameras 302l-302r may be mounted so that the distance DISHOR is the same as the distance DISVER.

In the example external view 480, the pair of vertically oriented stereo cameras 302l-302r are shown mounted on the driver side 482 of the ego vehicle 50. Similarly, another implementation of a pair of vertically oriented cameras may have a similar mounting configuration as the pair of vertically oriented stereo cameras 302l-302r on the passenger side of the ego vehicle 50 for training the CNN module 150. Similar implementations of the pair of vertically oriented stereo cameras 302l-302r may be implemented on the front and/or rear of the ego vehicle 50.

The pair of vertically oriented stereo cameras 302l-302r may be mounted to the ego vehicle 50 to enable collection of training data (e.g., the signal VDVER and the signal VDHOR). For example, the pair of vertically oriented stereo cameras 302l-302r may be installed on the ego vehicle 50 (e.g., on both the passenger side and the driver side 482 and/or other locations on the ego vehicle 50). The ego vehicle 50 may be driven normally (e.g., using a human driver in various driving scenarios to capture many different angles and views of many different scenes). The pair of vertically oriented stereo cameras 302l-302r may capture images while the ego vehicle 50 drives in various scenarios and/or contexts (e.g., captures images of different locations, in different lighting conditions (e.g., daytime, cloudy, night, rainy weather, snowy weather, etc.). Capturing images from the pair of vertically oriented stereo cameras 302l-302r while ego vehicle 50 drives may enable a large data set of the training data to be captured.

The training data captured may be used to train the neural network model 452. In the example shown, the external view 480 shows the pair of vertically oriented stereo cameras 302l-302r mounted to the ego vehicle 50 for collecting the training data for the directed acyclic graph 452. In some embodiments, the pair of vertically oriented stereo cameras 302l-302r may be trained offline (e.g., without the pair of vertically oriented stereo cameras 302l-302r attached to the ego vehicle 50). The method of providing various scenarios for capturing images using the pair of vertically oriented stereo cameras 302l-302r may be varied according to the design criteria of a particular implementation.

The external view 480 may illustrate an example of the pair of vertically oriented stereo cameras 302l-302r mounted to the ego vehicle 50. The pair of vertically oriented stereo cameras 302l-302r may be mounted to the ego vehicle 50 when the CNN module is in the training mode of operation (e.g., the neural network model 452 is being trained to generate the virtual horizontal DSIs). When the neural network model 452 is trained (e.g., the CNN module 150 implements the trained neural network model 352), the CNN module 150 may operate in the virtual DSI generation mode of operation. The CNN module 150 may operate in the virtual DSI generation mode of operation by receiving input from a single vertically oriented stereo camera 302. For example, when the CNN module 150 operates in the virtual DSI generation mode of operation, the ego vehicle 50 may be implemented with the single vertically oriented stereo camera 302 mounted instead of the pair of vertically oriented stereo cameras 302l-302r. For example, an implementation of the single vertically oriented stereo camera 302 may be mounted to each side of the ego vehicle 50.

Embodiments of the camera system 100 may be described with the CNN module 150 trained to generate virtual horizontal DSIs in response to input from a vertically oriented stereo camera and a vertical disparity image. Similarly, the camera system 100 may be configured to generate virtual vertical DSIs in response to input from a horizontally oriented stereo camera and a horizontal disparity image. For example, the disparity engine 164 may be configured to generate a horizontal disparity image in response to pixel data from a left and right capture device of a horizontally oriented stereo camera, and the CNN module 150 may be configured to generate the virtual vertical DSI in response to the horizontal disparity image and the pixel data from the left capture device (or right capture device) of the horizontally oriented stereo camera. Similarly, the CNN module 150 may be trained to generate the virtual horizontal DSIs by arranging a pair of horizontally oriented stereo cameras one above the other. For example, the left and right pixel data from one horizontally oriented stereo camera may be used to generate the horizontal disparity image to train the CNN module 150 and the left pixel data from the top and bottom horizontally oriented stereo camera (or the right pixel data from the top and bottom horizontally oriented stereo camera) may be used to generate a vertical DSI to be used as ground truth data for training the CNN module 150. The types of virtual DSIs generated by the camera system 100 may be varied according to the design criteria of a particular implementation.

Figure 9:
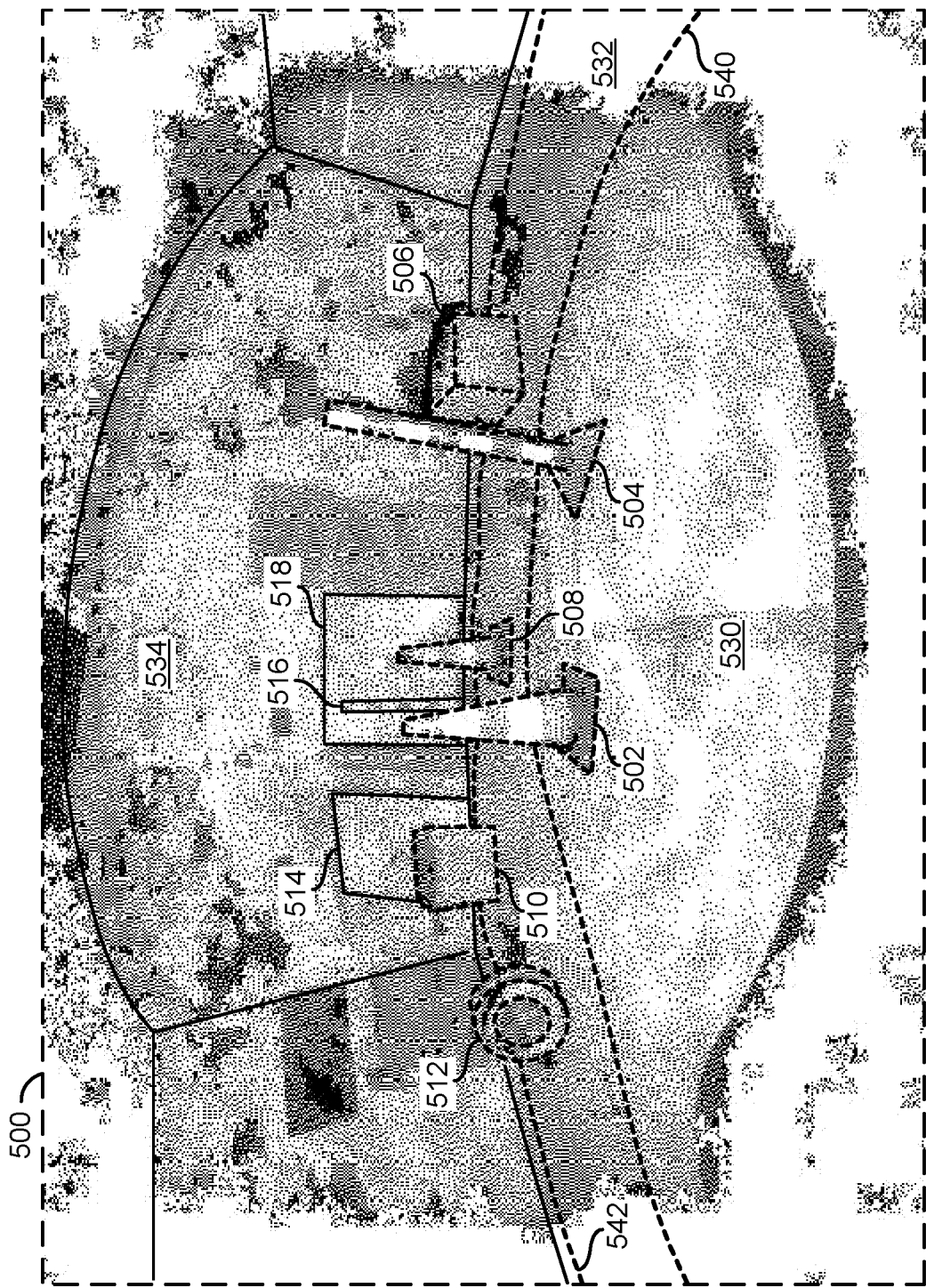
FIG. 9 is a diagram illustrating an example of a disparity image.

Referring to FIG. 9, a diagram illustrating an example of a disparity image is shown. A disparity image 500 is shown. The disparity image 500 may be a representative example of a disparity image generated by the disparity engine 164. In one example, the disparity image 500 may be a vertical disparity image (e.g., VDVER). In another example, the disparity image 500 may be a horizontal disparity image generated during training (e.g., VDHOR). In some embodiments, the disparity image 500 may be a representative example of a virtual disparity image generated by the CNN module 150. In an example, the disparity image 500 may be the virtual horizontal disparity image (e.g., VRTHIMG). The type of disparity image represented by the disparity image 500 may be varied according to the design criteria of a particular implementation.

The disparity image 500 may comprise data from multiple input images (e.g., a left video frame and a right video frame from a horizontally oriented stereo camera, a top video frame and a bottom video frame from a vertically oriented stereo camera, etc.). The disparity image 500 may comprise disparity values. The disparity values may be represented visually. In the disparity image 500, the disparity values may be represented as a heat map style image. In the example shown, a density of dots may represent a distance from the stereo camera 302 that captured the pixel data used for generating the disparity image 500. Generally, in some visual representations of disparity values, a different color may indicate a different distance of the objects from the stereo camera 302. Using the disparity image 500, the processors 106a-106n may use calibration data (e.g., distances between lenses, angle of the lenses with respect to each other, etc.) to convert disparity values to distance values.

The disparity image 500 may comprise a view from the perspective of the stereo camera 302. The disparity image 500 may comprise objects 502-518. The object 502 may be a pylon. The object 504 may be a tall and narrow pylon, the object 506 may be a box, the object 508 may be a pylon, the object 510 may be a box, the object 512 may be a wheel, the object 514 may be a board, the object 516 may be a tall and narrow pylon, the object 518 may be a board. The objects 502-518 are shown at various distances from the stereo camera 302 (not shown) that captured the pixel data used to generate the disparity image 500.

A region 530, a region 532 and a region 534. The region 530 may be a region nearest to the stereo camera 302. The region 532 may be a region a medium distance from the stereo camera 302. The region 534 may be a region farthest from the stereo camera 302 (e.g., extending to a back wall). The regions 530-534 are shown separated by dotted lines 540-542. The regions 530-534 may be general approximations of distance shown for illustrative and/or descriptive purposes. Generally, the disparity values may provide accurate measurements of distances that may be any measured value. The nearby region 530 is shown generally having a lower density of dots. The middle region 532 is shown generally having a medium density of dots. The far region 534 is shown generally having a high density of dots. The number of regions and/or distances to objects measured using the disparity values and/or the calibration data may be varied according to the design criteria of a particular implementation.

The pylon 502 and the tall and narrow pylon 504 are shown in the nearby region 530. The box 506, the pylon 508, the box 510 and the wheel 512 are shown in the middle region 532. The board 514, the tall and narrow pylon 516 and the board 518 are shown in the far region 534. Using the disparity values, the processors 106a-106n may be configured to determine how far away objects are from the stereo camera 302.

Since images captured by the cameras provide a two dimensional projection of a three dimensional environment, there may be difficulties in distinguishing where objects are oriented with respect to each other. For example, based on height, the board 518 may appear to be the same height as the tall and narrow pylon 504. However, the tall and narrow pylon 504 may be located closer to the stereo camera 302 (e.g., in the near region 530) than the board 518 (e.g., in the far region 534). The disparity values in the disparity image 500 may be used as another source of data that the processor 106a-106n may use to recognize objects, classify objects, determine a size of an object and/or a determine spatial relationships of objects. For a vertical disparity image, thin vertically oriented objects (such as the tall and narrow pylon 504 and the tall and narrow pylon 516) may represent a singularity in the disparity calculation. Additional data (e.g., disparity values from the virtual horizontal DSI) may provide further information to determine the disparity calculations to overcome the singularity.

Figure 10:
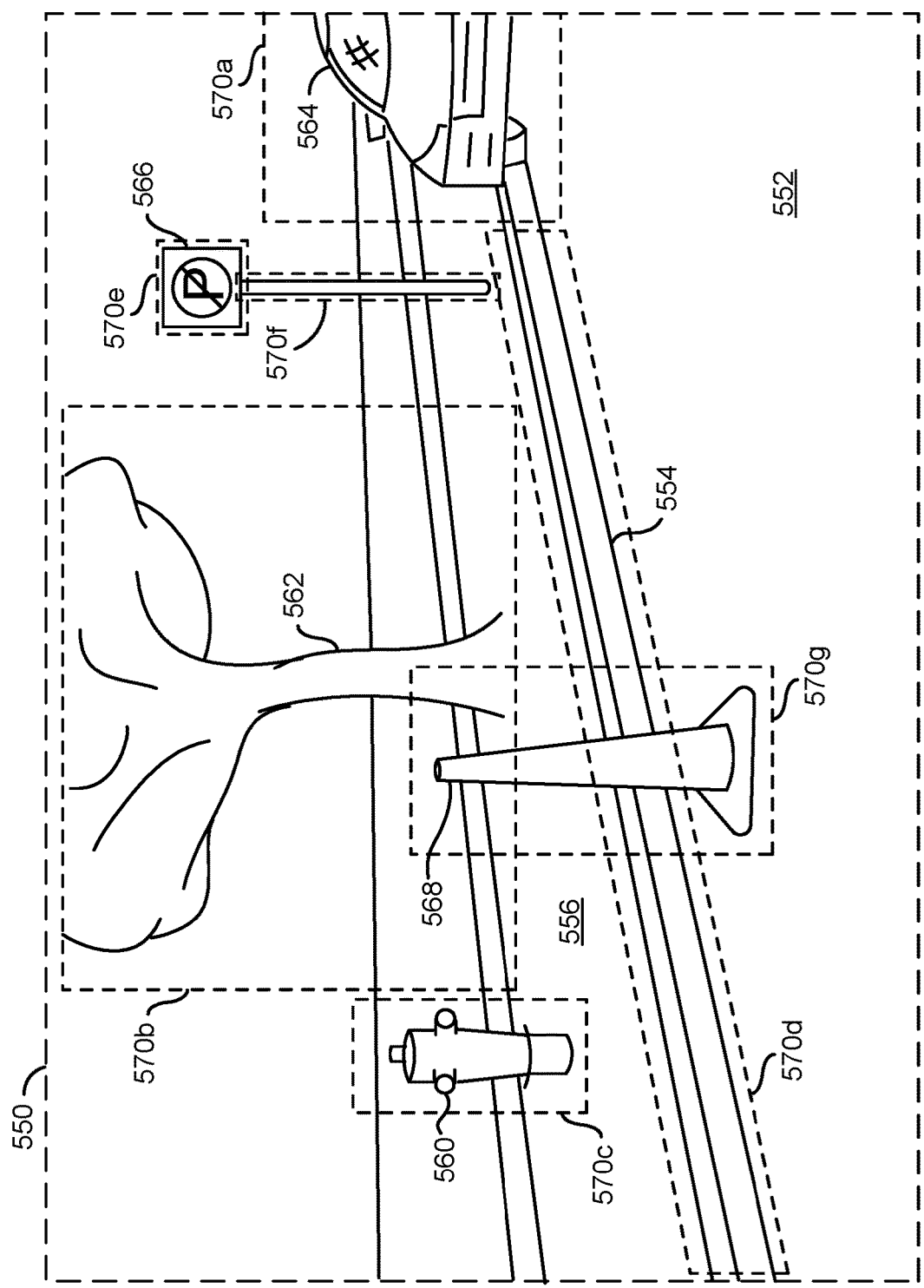
FIG. 10 is a diagram illustrating performing object detection in a video frame.

Referring to FIG. 10, a diagram illustrating performing object detection in a video frame is shown. An example video frame 550 is shown. The example video frame 550 may be a representative example of a video frame from a sequence of video frames generated in response to pixel data captured by the capture devices 102a-102b. The example video frame 550 may be one video frame of a stereo pair of video frames. The example video frame 550 may be generated when the apparatus 100 is operating in the virtual DSI generation mode of operation (e.g., one vertically oriented stereo camera 302 is used instead of the pair of vertically oriented cameras 302l-302r).

The example video frame 550 may provide a side view with respect to the ego vehicle 50. In the example shown, the example video frame 550 may be a video frame generated in response to pixel data captured by the passenger side stereo capture device 102i. The example video frame 550 may represent a video frame used by the processors 106a-106n to detect various objects using the data from the disparity images (e.g., the vertical disparity image and/or the virtual horizontal disparity image).

The example video frame 550 may comprise a view of the environment near the ego vehicle 50. The example video frame 550 may comprise a road 552, a curb 554 and a sidewalk area 556. The road 552 may be the road surface that the ego vehicle 50 may be currently driving on. The road 552 shown may be the road surface next to the passenger side of the ego vehicle 50. The curb 554 may separate the road from the sidewalk area 556 (e.g., an area where the ego vehicle 50 may not be intended to, or permitted to, drive on). The curb 554 may be an indication of a location where the ego vehicle 50 may autonomously perform parallel parking. For example, the processors 106a-106n may perform the object detection to detect the curb 554 and an open space on the roadway 552 and the decision module 158 may determine that the ego vehicle 50 may park next to the curb 554.

The example video frame 550 may further comprise an object 560, an object 562, an object 564, an object 566 and an object 568. The object 560 may be a fire hydrant. The object 562 may be a tree. The object 564 may be a vehicle. The object 566 may be a sign. The object 568 may be a tall and narrow pylon. The fire hydrant 560 may be located on the sidewalk area 556. The tree 562 may be located on the sidewalk area 556. The vehicle 564 may be parked on the road 552. The sign 566 may be located on the sidewalk area 556. The tall and narrow pylon 568 may be located on the road 552. The disparity images and/or the virtual disparity images generated by the processors 106a-106n may improve a success rate and/or confidence level of results of object detection performed by the processors 106a-106n on the example video frame 550.

Dotted boxes 570a-570f are shown. The dotted boxes 570a-570f may represent computer vision operations performed by the processors 106a-106n. The detection 570a may represent a detection of the vehicle 564. The detection 570b may represent a detection of the tree 562. The detection 570c may represent a detection of the fire hydrant 560. The detection 570d may represent a detection of the curb 554. The detection 570e may represent a detection of the sign 566. The detection 570f may represent a detection of a signpost of the sign 566. The detection 570g may represent a detection of the tall and narrow pylon 568. In an example, the dotted boxes 570a-570g may be a visual representation of the object detection (e.g., the dotted boxes 570a-570g may not appear on an output video frame displayed on one of the displays 118a-118n). In another example, the dotted boxes 570a-570g may be a bounding box generated by the processors 106a-106n displayed on the video frame to indicate that an object has been detected (e.g., the bounding boxes 570a-570g may be displayed in a debug mode of operation). The number and/or types of objects detected by the processors 106a-106n may be varied according to the design criteria of a particular implementation.

The object detection performed by the CNN module 150 may comprise a confidence level. The confidence level may provide an indication of how likely that the results of the object detection are accurate. For example, a low confidence level may indicate that the results of the object detection may be unreliable (e.g., inaccurate, have errors, etc.) and a high confidence level may indicate that the results of the object detection may be reliable (e.g., other systems of the ego vehicle 50 may use the results of the object detection, the processors 106a-106n may generate signals such as the signal VCTRL based on the results of the object detection, etc.). The memory 108 may store pre-determined confidence level thresholds for various functions of the processors 106a-106n.

The confidence level threshold may comprise a value of the confidence level of the results generated by the CNN module 150 that may be considered to be reliable (e.g., unreliable results below the confidence level threshold and reliable results above the confidence level threshold). In an example, if the processors 106a-106n detect the fire hydrant 560, the tree 562, the vehicle 564, the sign 566 and/or the tall and narrow pylon 568 with a confidence level greater than the threshold value, then the processors 106a-106n may generate the signal VCTRL to enable some type of response (e.g., autonomously perform vehicle maneuver, provide a warning to the driver 202, provide data to another system, etc.).

In some embodiments, the processors 106a-106n may be configured to detect, recognize and/or classify the detected objects 570a-570g. The processors 106a-106n may be further configured to infer depth by performing the analysis on the example video frame 550. The vertically oriented stereo camera 302 may provide disparity values that may be used to calculate the depth information. The disparity values may be determined for objects that are relatively large and/or relatively wide (e.g., with a high confidence). For example, the vertically oriented disparity image VDISP may provide disparity values that may be used to infer depth information for the curb 554, the fire hydrant 560, the tree 562 and/or the vehicle 564. Using the vertical disparity image VDISP may not provide reliable information for objects that may be relatively thin and vertically oriented. For example, the vertically oriented disparity image VDISP may provide unreliable disparity values for the tall and narrow pylon 568. The sign head object 570e may be detected and provide depth information, but the signpost (or pole) object 570f may be thin and vertically oriented (e.g., provide unreliable depth information).

The CNN module 150 may be configured to generate the virtual horizontally oriented disparity image VRTHIMG. The virtual horizontally oriented disparity image VRTHIMG may provide additional data points that may be used by the processors 106a-106n to infer depth information. For example, the additional data points provided by the virtual horizontally oriented disparity image VRTHIMG may provide reliable (e.g., accurate) disparity values for the tall and narrow objects (e.g., the tall and narrow pylon object 570g and the signpost object 570f). The additional data points provided by the virtual horizontally oriented disparity image VRTHIMG may enable the processor 106a-106n to infer depth information that may not be usable (or reliable) using the vertically oriented stereo image VDISP alone.

Inferring depth (e.g., a distance of a 3D point with respect to a camera) from monocular images may not be reliable due to images providing a projection of a 3D world point onto the 2D image plane. The projection causes the depth information to be lost. Without disparity values, the depth information may be computed by the processors 106a-106n at best up to a scale factor and generally using additional information such as camera motion and/or object geometry. Multiple views of the same scene (e.g., captured using the stereo camera 302) may enable the processors 106a-106n to re-construct the depth of a scene via point triangulation, provided that the length of the baseline in world units and the camera calibration parameters are known.

The CNN module 150 may be configured to solve the task of depth estimation from a single view of a 3D scene (e.g., using a single image). Using the vertical disparity data VDVER and the horizontal vertical disparity data VDHOR during a training mode of operation, the CNN module 150 may learn the distribution of the data the CNN module 150 is trained with (e.g., the pixel data captured by the left stereo camera 302l and the right stereo camera 302r). In the virtual DSI generation mode of operation, the apparatus 100 may not have access to both the left and right vertically oriented stereo cameras 302l-302r, which may prevent solving the problem geometrically. For the virtual horizontally oriented disparity image VRTHIMG, the CNN module 150 may predict a probability of the depth of each pixel in the input image according to the statistics extracted from the training dataset during the training mode of operation. Providing the training dataset during the training mode of operation may enable the CNN module 150 to generate virtual horizontally oriented disparity images even when the input from the vertically oriented stereo camera 302 are not similar to the ones contained in the training dataset (e.g., different viewpoint, different aspect ratio, a different scene, etc.).

The CNN module 150 may be configured to complete the depth (or disparity) to generate the virtual horizontal disparity image VRTHIMG. The CNN module 150 may be configured to implement semi-global-matching and/or oracle. In the training mode of operation, the CNN module 150 may be configured to learn how to complete (or refine)

the depth map which has been provided that does not depend on the training images. By completing/refining the depth map, the CNN module 150 may be capable of generating the virtual horizontal disparity image VRTHIMG even in the case of unseen viewpoints or scenes. Instead of learning to generate a full depth map for the virtual horizontal disparity image VRTHIMG, the CNN module 150 may learn to interpolate between given values using cues extracted from the images (e.g., the pixel data PXTL) and the depth map (e.g., the vertical disparity image VDISP). By filling in the disparity values, the processors 106a-106n may avoid a scenario of total system failure (e.g., the depth provided by the vertical image VDISP is not changed in any significant way).

Figure 11:
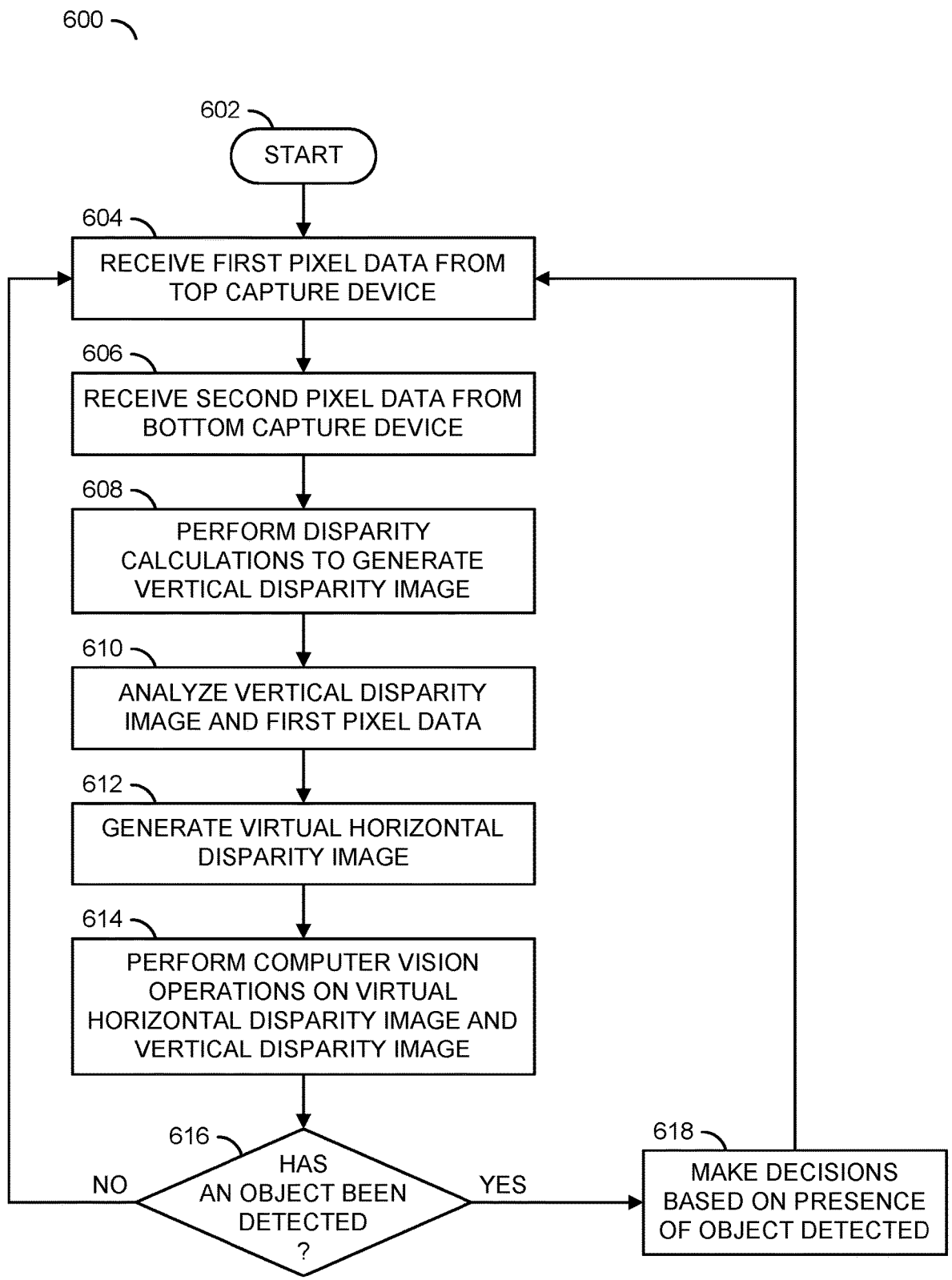
FIG. 11 is a flow diagram illustrating a method for generating a virtual horizontal disparity image.

Referring to FIG. 11, a method (or process) 600 is shown. The method 600 may generate a virtual horizontal disparity image. The method 600 generally comprises a step (or state) 602, a step (or state) 604, a step (or state) 606, a step (or state) 608, a step (or state) 610, a step (or state) 612, a step (or state) 614, a decision step (or state) 616, and a step (or state) 618.

The step 602 may start the method 600. In the step 604, the processors 106a-106n may receive the pixel data from one of the capture devices 102a-102b of the stereo camera 302. For example, the pixel data may be pixel data PXTL (or video frames) generated by the top capture device 102a of the vertically oriented stereo camera 302. Next, in the step 606, the processors 106a-106n may receive the pixel data from the other of the capture devices 102a-102b of the stereo camera 302. For example, the pixel data may be the pixel data PXBL (or video frames) generated by the bottom capture device 102b of the vertically oriented stereo camera 302. For example, the method 600 may be performed when the apparatus 100 operates in the virtual DSI generation mode of operation (e.g., one vertically oriented stereo camera 302 is implemented instead of the pair of vertically oriented stereo cameras 302l-302r). Next, the method 600 may move to the step 608.

In the step 608, the disparity engine 164 may be configured to perform disparity calculations to generate the vertical disparity image VDISP. For example, the disparity calculations may infer disparity values based on the pair of input stereo images and calibration data. Next, in the step 610, the CNN module 150 may analyze the vertical disparity image VDISP and one of the input pixel data (or video frames). For example, the trained neural network model 352 may analyze the vertical disparity image VDISP and the pixel data (or video frames) PXTL. In the step 612, the CNN module 150 may generate the virtual horizontal disparity image VRTHIMG. Next, in the step 614, the processors 106a-106n may perform computer vision operations on the virtual horizontal disparity image VRTHIMG and the vertical disparity image VDISP. For example, the CNN module 150 may be further trained to perform computer vision operations (e.g., object detection, object recognition, object classification, etc.) and may use the disparity values to infer depth information for each object detected. Next, the method 600 may move to the decision step 616.

In the decision step 616, the processor 106a-106n may determine whether an object has been detected. For example, the sensor fusion module 152 may determine a confidence level of the object detection performed using data from various sources (e.g., the computer vision operations, the depth information, etc.). If no object has been detected, the method 600 may return to the step 604. If an object has been detected, the method 600 may move to the step 618. In the step 618, the decision module 158 may make decisions based on the presence of the object detected. For example, the decision module 158 may determine an autonomous vehicle maneuver to perform, determine a warning to provide to the driver 202, etc. Next, the method 600 may return to the step 604.

Figure 12:
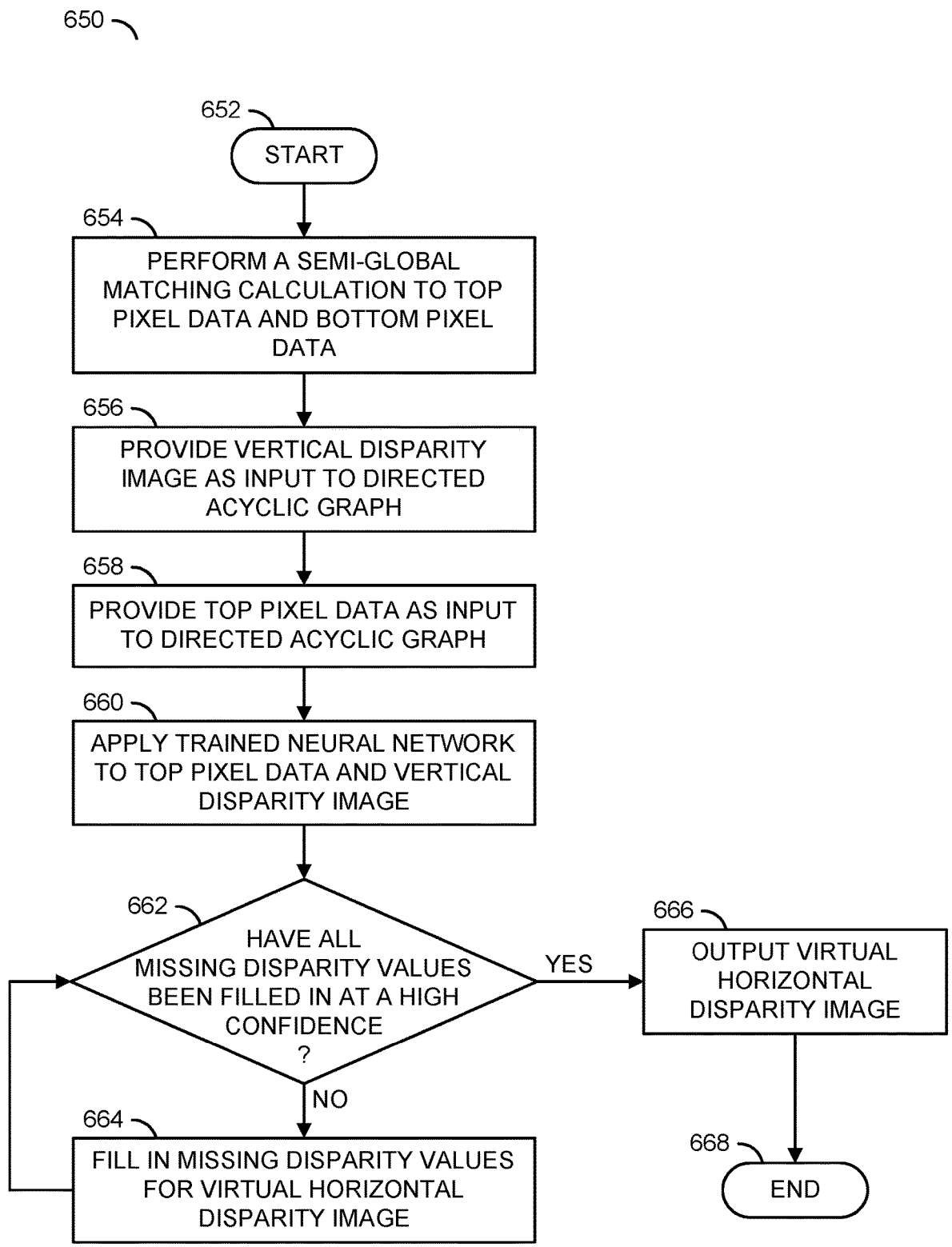
FIG. 12 is a flow diagram illustrating a method for generating a virtual horizontal disparity image using a directed acyclic graph.

Referring to FIG. 12, a method (or process) 650 is shown. The method 650 may generate a virtual horizontal disparity image using a directed acyclic graph. The method 650 generally comprises a step (or state) 652, a step (or state) 654, a step (or state) 656, a step (or state) 658, a step (or state) 660, a decision step (or state) 662, a step (or state) 664, a step (or state) 666, and a step (or state) 668.

The step 652 may start the method 650. In the step 654, the disparity engine 164 may perform a semi-global matching calculation on the top pixel data PXTL and the bottom pixel data PXBL. For example, in the method 650, the apparatus 100 may operate in the virtual DSI generation mode of operation (e.g., one vertically oriented stereo camera 302 is implemented instead of the pair of vertically oriented stereo cameras 302l-302r). The semi-global matching calculations may generate the vertical disparity image VDISP. In the step 656, the disparity engine 164 may provide the vertical disparity image VDISP as an input to the trained directed acyclic graph 352 used by the CNN module 150. Next, the method 650 may move to the step 658.

In the step 658, the stereo camera 302 may provide the top pixel data PXTL as an input to the trained directed acyclic graph 352 used by the CNN module 150. In some embodiments (e.g., depending on how the CNN module 150 was trained), the bottom pixel data PXBL may be provided as input. Next, in the step 660, the CNN module 150 may apply the trained neural network 352 to the top pixel data PXTL and the vertical disparity image VDISP. Next, the method 650 may move to the decision step 662.

In the decision step 662, the CNN module 150 may determine whether all of the missing disparity values have been filled at a high confidence level. If the missing disparity values have not been filled in at a high confidence level, then the method 650 may move to the step 664. In the step 664, the CNN module 150 may fill in missing disparity values for the virtual horizontal disparity image VRTHIMG. For example, the CNN module 150 may interpolate between given values using cues extracted from the images (e.g., the pixel data PXTL) and the depth map (e.g., the vertical disparity image VDISP). Next, the method 650 may return to the decision step 662.

In the decision step 662, if all of the missing disparity values have been filled in at a high confidence level, then the method 650 may move to the step 666. In the step 666, the CNN module 150 may output the virtual horizontal disparity image VRTHIMG. Next, the method 650 may move to the step 668. The step 668 may end the method 650.

Referring to FIG. 13, a method (or process) 700 is shown. The method 700 may train a convolutional neural network to generate virtual horizontal disparity images using two vertically oriented stereo cameras. The method 700 generally comprises a step (or state) 702, a decision step (or state) 704, a step (or state) 706, a step (or state) 708, a step (or state) 710, a step (or state) 712, a step (or state) 714, a step (or state) 716, and a step (or state) 718.

The step 702 may start the method 700. Next, in the decision step 704, the processors 106a-106n may determine whether the CNN module 150 is in the training mode of operation. For example, when the CNN module 150 is in the training mode of operation, the apparatus 100 may comprise the left stereo camera 302l and the right stereo camera 302r. In one example, the processors 106a-106n may perform various uncertainty measures to determine whether the neural network model 452 has been sufficiently trained to fill in missing disparity values to create the virtual horizontal disparity images. If the CNN module 150 is not in the training mode of operation (e.g., the CNN module 150 is in the virtual DSI generation mode of operation), then the method 700 may move to the step 718. If the CNN module 150 is operating in the training mode of operation, then the method 700 may move to the step 706.

In the step 706, the disparity engine 164 may receive top pixel data (or video frames) and bottom pixel data (or video frames) from one of the pair of stereo cameras 302*l*-302*r*. For example, the disparity engine 164 may receive the signal PXTL from the top capture device 102*la* and the signal PXBL from the bottom capture device 102*lb* of the left stereo camera 302*l*. Next, in the step 708, the disparity engine 164 may receive top pixel data (or video frames) and bottom pixel data (or video frames) from the other of the pair of stereo cameras 302*l*-302*r*. For example, the disparity engine 164 may receive the signal PXTR from the top capture device 102*ra* and the signal PXBR from the bottom capture device 102*rb* of the right stereo camera 302*r*. In the step 710, the disparity engine 164 may generate the vertical disparity image VDVER in response to the top pixel data (or video frames) and the bottom pixel data (or video frames) received from one of the pair of stereo cameras 302*l*-302*r*. The vertical disparity image VDVER may be generated in response to the pixel data PXTL and the pixel data PXBL received from the left stereo camera 302*l*. Next, the method 700 may move to the step 712.

In the step 712, the disparity engine 164 may generate the horizontal disparity image VDHOR in response the top pixel data from both of the pair of stereo cameras 302*l*-302*r*. In an example, the signal VDHOR may be generated in response to the signal PXTL generated by the top capture device 102*la* of the left stereo camera 302*l* and the signal PXTR generated by the top capture device 102*ra* of the right stereo camera 302*r*. Next, in the step 714, the disparity engine 164 may present the vertical disparity image VDVER and the horizontal disparity image VDHOR to the CNN module 150. Next, the method 700 may move to the step 716.

In the step 716, the CNN module 150 may compare the vertical disparity image VDVER to the horizontal disparity image VDHOR. The horizontal disparity image VDHOR may be ground truth data that may be used by the neural network model 452 to learn how to generate (e.g., fill in the missing disparity values for) the virtual horizontal disparity image VRTHIMG. Next, the method 700 may move to the step 718. The step 718 may end the method 700.

Generally, when the apparatus 100 is operating in the training mode of operation, the steps 706-716 may be repeated until the neural network model 452 is sufficiently trained to generate the virtual horizontal disparity image VRTHIMG. In some embodiments, the training data acquired (e.g., the vertical disparity image VDVER, the horizontal disparity image VDHOR and/or the pixel data PXTL, PXTR, PXBL, PXBR) may be communicated to a cloud processing service to gather large amounts of training data from multiple sources (e.g., multiple implementations of the apparatus 100 operating in the training mode of operation on different vehicles each gathering training data). The training data may be analyzed on the cloud processing service to generate the neural network model that may be deployed to the processors 106*a*-106*n* as the trained neural network model 352).

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first capture device configured to generate first pixel data;
a second capture device configured to generate second pixel data, wherein said first capture device and said second capture device are implemented in a vertical orientation; and
a processor configured to (i) process said first pixel data and said second pixel data arranged as a vertical disparity image, (ii) generate a virtual horizontal disparity image in response to (a) said first pixel data and (b) said vertical disparity image and (iii) detect objects by analyzing (a) said vertical disparity image and (b) said virtual horizontal disparity image, wherein an analysis of said virtual horizontal disparity image enables said processor to detect said objects not detected in said vertical disparity image alone.

2. The apparatus according to claim 1, wherein said vertical orientation comprises said first capture device located above said second capture device.

3. The apparatus according to claim 1, wherein said virtual horizontal disparity image comprises an intelligent estimation performed by said processor of a horizontal disparity image that would be generated in response to (a) third pixel data generated from a third capture device in a horizontal orientation with said first capture device and (b) said first pixel data.

4. The apparatus according to claim 1, wherein (i) said processor is configured to implement a convolutional neural network and (ii) said convolutional neural network is configured to generate said virtual horizontal disparity image.

5. The apparatus according to claim 4, wherein said convolutional neural network is configured to generate said virtual horizontal disparity image in response to providing said first pixel data as input to a directed acyclic graph.

6. The apparatus according to claim 5, wherein said directed acyclic graph is generated by said convolutional neural network in response to training data.

7. The apparatus according to claim 6, wherein said training data is generated in response to (a) said first pixel data generated by said first capture device, (b) third pixel data from a third capture device and (c) said vertical disparity image.

8. The apparatus according to claim 7, wherein (i) said first capture device and said second capture device are implemented as a first stereo camera, (ii) said third capture device is implemented as a component of a second stereo camera, (iii) said second stereo camera comprises said third capture device and a fourth capture device and (iv) said third capture device and said fourth capture device are in said vertical orientation.

9. The apparatus according to claim 8, wherein (i) said first stereo camera and said second stereo camera are mounted on a vehicle and (ii) said vehicle is used to enable capturing a large data set of said training data.

10. The apparatus according to claim 9, wherein training used for generating said directed acyclic graph is performed offline without said first stereo camera and said second stereo camera attached to said vehicle.

11. The apparatus according to claim 7, wherein said third capture device is located in a horizontal orientation with respect to said first capture device.

12. The apparatus according to claim 1, wherein said apparatus is implemented as part of a computer vision system for a vehicle to generate an all-around view of said vehicle.

13. The apparatus according to claim 1, wherein said apparatus is configured to capture a rear-view of a vehicle.

14. The apparatus according to claim 1, wherein said objects not detected in said vertical disparity image alone comprise thin vertically oriented objects that result in a singularity in a disparity calculation.

15. The apparatus according to claim 14, wherein said disparity calculation used to generate said vertical disparity image comprises a semi-global matching calculation.

16. The apparatus according to claim 14, wherein said thin vertically oriented objects comprise poles.

17. The apparatus according to claim 1, wherein said processor generates said virtual horizontal disparity image by filling in missing disparity values.

18. A method for generating a virtual horizontal disparity image, comprising the steps of:
receiving first top pixel data and first bottom pixel data from a first vertically oriented stereo camera;
receiving second top pixel data from a second vertically oriented stereo camera, wherein said first top pixel data is in a horizontal orientation with said second top pixel data;
generating training data for a virtual horizontal disparity image in response to said first top pixel data, said first bottom pixel data and said second top pixel data;
generating a vertical disparity image in response to said first top pixel data and said first bottom pixel data; and
generating a virtual horizontal disparity image in response to (a) said first top pixel data, (b) said vertical disparity image and (c) said training data, wherein
(a) said training data is generated with said first vertically oriented stereo camera implemented together with said second vertically oriented stereo camera, and
(b) said virtual horizontal disparity image is generated with said first vertically oriented stereo camera implemented without said second vertically oriented stereo camera.

19. The method according to claim 18, further comprising the step of:
detecting objects by analyzing (a) said vertical disparity image and (b) said virtual horizontal disparity image, wherein an analysis of said virtual horizontal disparity image enables detecting said objects using a processor that are not detected by said processor using said vertical disparity image alone.

20. An apparatus comprising:
an interface configured to receive (i) first pixel data and (ii) second pixel data; and
a processor configured to (i) connect to said interface, (ii) generate a horizontal disparity image in response to (a) said first pixel data and (b) said second pixel data, (iii)

generate a virtual vertical disparity image in response to (a) said first pixel data and (b) said horizontal disparity image and (iv) detect objects by analyzing (a) said horizontal disparity image and (b) said virtual vertical disparity image, wherein
(a) an analysis of said virtual vertical disparity image enables said processor to detect said objects not detected in said horizontal disparity image alone,
(b) said first pixel data and said second pixel data are generated by a stereo camera,
(c) said stereo camera comprises a first capture device and a second capture device implemented in a horizontal orientation,
(d) said first capture device is configured to generate said first pixel data, and
(e) said second capture device is configured to generate said second pixel data.

\* \* \* \* \*